(12) United States Patent
Jackson et al.

(10) Patent No.: US 10,540,176 B2
(45) Date of Patent: Jan. 21, 2020

(54) METHOD AND SYSTEM FOR CONTROLLING SOFTWARE RISKS FOR SOFTWARE DEVELOPMENT

(71) Applicant: Sonatype, Inc., Fulton, MD (US)

(72) Inventors: Wayne Jackson, Columbia, MD (US); Michael Hansen, Potomac Falls, VA (US); Brian Fox, Goffstown, NH (US); Jaime Whitehouse, Guelph (CA); Jason Dillon, San Jose, CA (US)

(73) Assignee: Sonatype, Inc., Fulton, MD (US)

( * ) Notice: Subject to any disclaimer, the term of this patent is extended or adjusted under 35 U.S.C. 154(b) by 61 days.

(21) Appl. No.: 14/951,923

(22) Filed: Nov. 25, 2015

(65) Prior Publication Data

US 2017/0147338 A1      May 25, 2017

(51) Int. Cl.
| | |
|---|---|
| *G06F 8/77* | (2018.01) |
| *G06F 8/71* | (2018.01) |
| *G06F 21/10* | (2013.01) |
| *G06F 11/36* | (2006.01) |
| *G06F 21/57* | (2013.01) |

(Continued)

(52) U.S. Cl.
CPC .......... *G06F 8/77* (2013.01); *G06F 8/71* (2013.01); *G06F 11/36* (2013.01); *G06F 21/105* (2013.01); *G06F 21/577* (2013.01); *G06F 8/36* (2013.01); *G06F 11/008* (2013.01); *G06F 2221/033* (2013.01)

(58) Field of Classification Search
CPC ..... G06F 8/70; G06F 8/71; G06F 8/75; G06F 8/751; G06F 8/77; G06F 11/3664; G06F 21/10; G06F 21/105; G06F 21/44; G06F 21/56; G06F 21/57; G06F 21/577

USPC ........................ 717/101, 120–122, 124–126
See application file for complete search history.

(56) References Cited

U.S. PATENT DOCUMENTS

| | | |
|---|---|---|
| 5,748,884 A | 5/1998 | Royce et al. |
| 5,754,938 A | 5/1998 | Herz et al. |

(Continued)

OTHER PUBLICATIONS

Hasselbring, W., et al., Liability Risks in Reusing Third-Party Software, Communications of the ACM, vol. 49 Issue 12, Dec. 2006, p. 144, [retrieved on Aug. 19, 2019], Retrieved from the Internet.*

(Continued)

*Primary Examiner* — Geoffrey R St Leger
(74) *Attorney, Agent, or Firm* — Posz Law Group, PLC

(57) ABSTRACT

A computer system, method, or computer-readable medium controls a potentially unacceptable software component intended for a software repository. A pre-defined application or repository policy associated with the repository or application pre-defines risks and, for each of the risks, an action to take for the risk. The action can be a pass action or a does-not-pass action, which are pre-defined programmatic steps also defined in the policy. When the component is not new to the repository or the application, the component is passed through for the usual handling. When the component is new, risks are determined that match the software component; for risks which match, the actions are taken as defined in the pre-defined policy. The pass action can include adding the software component to the software repository. The does-not-pass action is followed for a component that does not pass as a potentially unacceptable software component.

24 Claims, 9 Drawing Sheets

(51) Int. Cl.
*G06F 8/36* (2018.01)
*G06F 11/00* (2006.01)

(56) References Cited

U.S. PATENT DOCUMENTS

| | | | | |
|---|---|---|---|---|
| 6,701,440 | B1* | 3/2004 | Kim | G06F 21/56 713/188 |
| 6,725,214 | B2 | 4/2004 | Garcia-Chiesa | |
| 7,386,531 | B2 | 6/2008 | Kiessig et al. | |
| 7,653,893 | B2* | 1/2010 | Neumann | G06F 8/71 713/100 |
| 7,895,572 | B2 | 2/2011 | Stienhans | |
| 8,613,082 | B2* | 12/2013 | Aono | G06F 21/105 726/21 |
| 8,745,583 | B2 | 6/2014 | Ronen et al. | |
| 8,782,607 | B2* | 7/2014 | Andersen | G06F 11/0793 717/101 |
| 8,825,689 | B2 | 9/2014 | Fedorenko et al. | |
| 8,978,124 | B2* | 3/2015 | Bradley, II | G06F 21/6218 380/229 |
| 9,100,424 | B1 | 8/2015 | Thomas | |
| 9,207,931 | B2 | 12/2015 | Fox et al. | |
| 9,224,103 | B1 | 12/2015 | Subramanya | |
| 9,235,572 | B2 | 1/2016 | Robert et al. | |
| 9,330,095 | B2 | 5/2016 | Fedorenko et al. | |
| 9,354,865 | B2* | 5/2016 | Fiebig | G06F 8/70 |
| 9,678,743 | B2 | 6/2017 | Fox et al. | |
| 9,971,594 | B2 | 5/2018 | Fox et al. | |
| 2002/0055942 | A1 | 5/2002 | Reynolds | |
| 2006/0200803 | A1* | 9/2006 | Neumann | G06F 8/71 717/120 |
| 2010/0058307 | A1 | 3/2010 | DeHaan | |
| 2010/0095277 | A1* | 4/2010 | Cheng | G06F 8/71 717/127 |
| 2010/0218169 | A1* | 8/2010 | Andersen | G06F 11/0793 717/125 |
| 2011/0061102 | A1* | 3/2011 | Aono | G06F 21/105 726/21 |
| 2011/0296398 | A1 | 12/2011 | Vidal | |
| 2012/0090025 | A1 | 4/2012 | Milner et al. | |
| 2012/0197832 | A1 | 8/2012 | Shanmukh et al. | |
| 2012/0290544 | A1 | 11/2012 | Abuelsaad et al. | |
| 2013/0036400 | A1* | 2/2013 | Bak | G06F 8/71 717/101 |
| 2013/0097688 | A1* | 4/2013 | Bradley, II | G06F 21/6218 726/9 |
| 2013/0219361 | A1* | 8/2013 | Fiebig | G06F 8/70 717/121 |
| 2013/0276114 | A1 | 10/2013 | Friedrichs et al. | |
| 2013/0340076 | A1* | 12/2013 | Cecchetti | G06F 21/55 726/23 |
| 2014/0164059 | A1* | 6/2014 | Dove | G06N 5/003 705/7.31 |
| 2014/0222758 | A1 | 8/2014 | March et al. | |
| 2014/0344936 | A1* | 11/2014 | Thario | G06F 21/577 726/25 |
| 2015/0186253 | A1* | 7/2015 | Abraham | G06F 11/3688 717/124 |
| 2015/0205600 | A1* | 7/2015 | Grillo | G06F 16/148 717/101 |
| 2016/0246699 | A1* | 8/2016 | Edri | G06F 8/68 |

OTHER PUBLICATIONS

Menegay, C., Using Source Code Control in Team Foundation, NotionSolutions, Sep. 2005, 15 pages, [retrieved on Aug. 19, 2019], Retrieved from the Internet.*

Helmreich, M., Best Practices of Adopting Open Source Software in Closed Source Software Products, Institut für Informatik, 2011, 103 pages, [retrieved on Aug. 19, 2019], Retrieved from the Internet.*

Office Action issued by the U.S. Patent Office dated Sep. 22, 2016 in the related U.S. Appl. No. 14/102,713.

Mockus et al., "A Case Study of Open Source Software Development: The Apache Server", 2000, Proceedings of the 22$^{nd}$ International Conference on Software Engineering, pp. 263-272.

International Search Report and Written Opinion of the International Searching Authority dated Jan. 30, 2017 for the corresponding international application No. PCT/US 16/61312.

Notice of Allowance issued by the U.S. Patent Office dated Jan. 11, 2017 in related U.S. Appl. No. 14/102,713.

Callahan et al., "Web-based issue tracking for large software projects," 1998, IEEE Internet Computing, vol. 2, Issue 5, pp. 25-33.

Hyland-Wood et al., "Toward a Software Maintenance Methodology using Semantic Web Techniques," 2006, IEEE, Second International IEEE Workshop on Software Evolvability, pp. 1-8.

Kim et al., "Classifying Software Changes: Clean or Buggy?," IEEE Transactions on Software Engineering, 2008, vol. 34, Issue 2, pp. 181-196.

Office Action issued by the U.S. Patent Office dated Nov. 17, 2015 in the related U.S. Appl. No. 14/102,713.

Notice of Allowance issued by the U.S. Patent Office dated Jan. 13, 2016 in connection with related U.S. Appl. No. 14/271,648.

Final Office Action issued by the U.S. Patent Office dated Mar. 11, 2016 in the related U.S. Appl. No. 14/102,713.

Hansen, Mike. "Software Supply Chain Automation," TheNexus, A Community Project [online]. May 13, 2015 [retrieved on Oct. 26, 2015]. Retrieved from the Internet: <http://www.sonatype.org/nexus/2015/05/13/software-supply-chain-automation>.

Hansen, Mike. "Modem Software: A Shell Game of Near Infinite Dimensions," TheNexus, A Community Project [online]. Nov. 4, 2014 [retrieved on Oct. 26, 2015]. Retrieved from the Internet: <http://www.sonatype.org/nexus/2014/11/04/modem-software-a-shell-game-of-near-infinite-dimensions>.

Hansen, Mike. "An Open Source License to Speed," TheNexus, A Community Project [online]. Dec. 10, 2014 [retrieved on Oct. 26, 2015]. Retrieved from the Internet: <http:/www.sonatype.org/nexus/2014/12/10/an-open-source-license-to-speed>.

Office Action issued by the U.S. Patent Office dated Aug. 18, 2017 in the related U.S. Appl. No. 15/238,008.

Salton et al., "Generation and Search of Clustered Files," 1978, ACM Transactions on Database Systems, vol. 3, No. 4, pp. 321-346.

Yu et al., "Analysis of Effectiveness of Retrieval in Clustered Files," 1977, Journal of the Association for Computing Memory, vol. 24, No. 4, pp. 607-622.

Communication pursuant to Article 94(3) EPC dated Jul. 17, 2017 in European Patent Application No. 13 793 818.9.

International Search Report and Written Opinion of the International Searching Authority dated Sep. 29, 2017 for the corresponding international application no. PCT/US2017/043006.

Notice of Allowance issued by the U.S. Patent Office dated Jan. 17, 2018 in related U.S. Appl. No. 15/238,008.

International Preliminary Report on Patentability and Written Opinion dated Jun. 7, 2018 by the International Bureau of WIPO in connection with international application No. PCT/US2016/061312, which corresponds to related U.S. Appl. No. 14/951,923.

Communication pursuant to Rules 70(2) and 70a(2) EPC dated Jun. 7, 2019 issued in corresponding EP patent application No. 16869061.8.

Extended EP Search Report dated May 22, 2019 issued in corresponding EP patent application No. 16869061.8.

* cited by examiner

METHOD AND SYSTEM FOR CONTROLLING SOFTWARE RISKS FOR SOFTWARE DEVELOPMENT

TECHNICAL FIELD

The technical field relates in general to software development, and more specifically to software component repositories used in component-based software development.

BACKGROUND

About fifteen years ago, software developers used very little open source software and instead tended to write most or all of the software themselves. By comparison, today the majority of the software components that comprise an application are written by others. In today's software development field, software components created by others are used much more than ever before, and this trend is increasing.

As a result, today's developers have, in effect, delegated the responsibility for quality to the open source community. A popular belief with regard to open source software components is that the software component must be good because numerous developers are looking at it. This, however, is a faulty assumption. Sometimes open source software has many issues.

The developers, moreover, have little visibility and understanding of the open source software components which they are using. The available tools for software development makes it easy to use open source, but the tools do not make it easy to understand the open source and its possible issues. Compounding the lack of visibility and understanding is the fact that software from the open source realm tends to depend on other open source elements.

A software repository is a known technique to provide developers with a convenient collection of re-used and re-usable software components, whether open source or otherwise. In other words, a software repository provides a storage of components which the software developers will use.

A conventional repository manager can be used as a central point of storage and exchange for software component usage. For example, a conventional repository manager provides the ability to proxy a remote repository and to cache components into a local repository, to save bandwidth and time required to repeatedly retrieve a software component from a remote repository. The ability to host a local repository provides an organization with a convenient collection of software components used by the organization. Nevertheless, the problem with visibility and understanding of the software components remains.

SUMMARY

Accordingly, one or more embodiments provide a computer. The computer includes an i/o interface operable to communicate with a software repository; and a processor cooperatively operable with the i/o interface. The processor is configured to perform the following.

A method controls a potentially unacceptable software component intended for a repository environment which includes a software repository. In a policy storage, a pre-defined repository policy is provided which is associated with the repository environment. The pre-defined repository policy defines risks and, for each of the risks, an action to take for the risk, wherein the actions to take for the risk are selected from at least a pass action and a does-not-pass action, wherein the actions are pre-defined programmatic steps. Responsive to receiving a request for a software component, it is determined whether the software component which is requested is new to the software repository.

When the software component is determined to not be new to the software repository: the software component is passed through.

When the software component is determined to be new to the software repository: it is determined, from a risk match unit, the risks which match the software component. The risks which were determined to match the software component are evaluated to determine the actions, as defined in the pre-defined repository policy, to take for the risks determined to match the software component. The pass action, defined in the pre-defined repository policy, is followed for components that are determined to pass, wherein the pass action includes to add the software component to the software repository, when the risk of the software component is evaluated to pass the pre-defined repository policy. The does-not-pass action, defined in the pre-defined repository policy, is followed for components that are determined to not pass as a potentially unacceptable software component, when the risk of the software component is evaluated to not pass the pre-defined repository policy.

In another embodiment, the pre-defined repository policy further comprises a pre-defined action to take for a partially matching software component. When the software component is determined to be new to the software repository, and when it is determined that the software component does not match any of the components that is known to the risk match unit, a deep inspection of internal software components is recursively performed at a next layer internal to the software component until the internal software components are determined which match a known component which is known to the risk match unit; The step of determining the risks is performed for the internal software components which are matched to known software components. The step of evaluating the risks is performed for the risks of the internal software components which are matched to known software components. The step of following the action defined in the pre-defined repository policy is performed, for the risks of the internal components which are matched to known components, in combination with following the pre-defined action to take for the partially matching software component.

In still another embodiment, there is provided a quarantine storage which is quarantined from user access, and a log of components in the quarantine storage. The software component, which is determined to be the potentially unacceptable software component, is isolated by being stored into quarantine storage instead of being stored in the software repository; and a fact that the software component is quarantined is stored. Responsive to receiving the request for the software component, it is determined whether the software component which is requested is in the quarantine storage, and a quarantine notification is provided that the software component is determined to be quarantined and not in the software repository.

In yet another embodiment, when the software component is determined to be quarantined, a different version of the quarantined component is determined by the system wherein the different version is known to pass the pre-defined repository policy, and the quarantine notification further indicates the different version of the quarantined component that passes the pre-defined repository policy.

In still another embodiment, when the component has been quarantined, a user is guided through determining whether the quarantined component should be accepted into the software repository as waived, and then the quarantined component which is waived is moved from the quarantine into the software repository, despite not passing the repository policy.

In a further embodiment, the determination of the risks includes preparing a risks lookup key based on metadata of the software component; and retrieving, based on the risks lookup key from the software component, information indicating the risks of the software component.

In yet another embodiment, the risks, defined in the pre-defined repository policy for software components, include licenses to which the software component is subject, and security vulnerabilities of the software component. The determination of the risks includes preparing, based on metadata from the software component, a licenses-lookup key and a security-vulnerabilities-lookup key, which are both unique to the software component; retrieving, from a licenses-lookup information provider, based on the licenses-lookup key for the software component, information indicating the licenses of the software component; and retrieving, from a security vulnerabilities information provider, based on the security-vulnerabilities-lookup key for the software component, information indicating the security vulnerabilities of the software component.

In still another embodiment, the action to take when the software component is determined to be new to the software repository and the risks of the software component are all evaluated to pass the pre-defined repository policy with no errors, include one or more of: logging the software component which is being added to the software repository; and notifying, by the processor, via e-mail, of the new component.

In a different embodiment, potentially unacceptable software component is controlled which is intended for a repository environment which includes a software repository. A policy storage provides a pre-defined application policy associated with both the repository environment and an application, the pre-defined application policy is different from a policy associated with the repository and the pre-defined application policy can be different from policies associated with other applications. The pre-defined application policy defines risks and, for each of the risks, an action to take for the risk, wherein the actions to take for the risk are selected from at least a pass action and a does-not-pass action, wherein the actions are pre-defined programmatic steps. Responsive to a commit asset action or build action for the application that includes software components, it is determined, for each of the software components, whether the software component which is requested is new to the application.

When the software component is determined to not be new to the application: the software component is passed through.

When the software component is determined to be new to the application, it is determined, from a risk match unit, risks which match the software component. The risks which were determined to match the software component are evaluated to determine the actions, as defined in the pre-defined application policy, to take for the risks determined to match the software component. The pass action, defined in the pre-defined application policy, is followed for components that are determined to pass, wherein the pass action includes to add the software component to the software repository, when the risk of the software component is evaluated to pass the pre-defined application policy. The does-not-pass action, defined in the pre-defined repository policy, is followed for components that are determined to not pass as a potentially unacceptable software component, when the risk of the software component is evaluated to not pass the pre-defined application policy.

A further embodiment is a computer-implemented method, according to one or more of the above embodiments.

Still another embodiment is a non-transitory computer-readable medium comprising instructions for execution by a computer, the instructions including a computer-implemented method as above, the instructions for implementing the method in a processor.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

Figure 1:
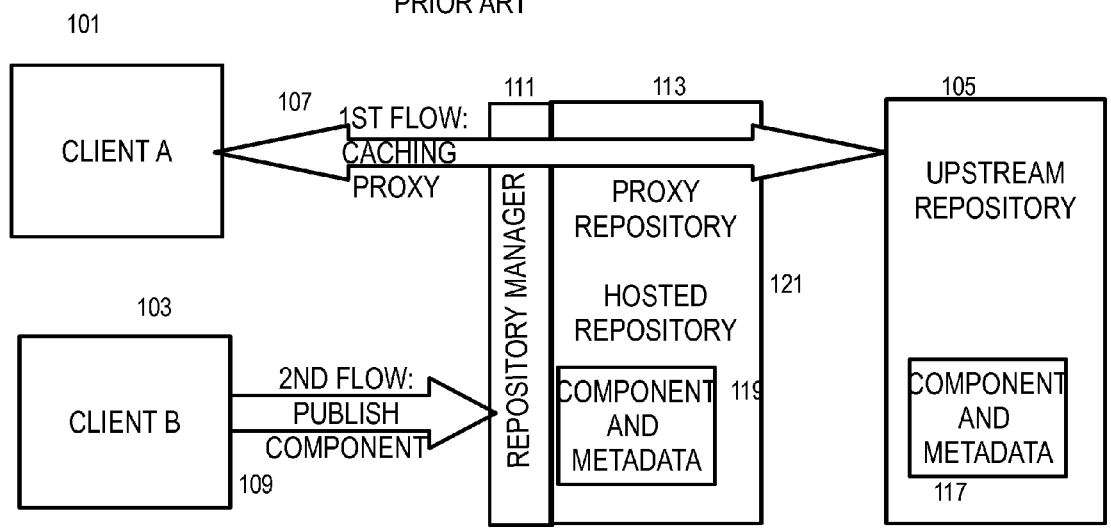
FIG. 1 is a data flow diagram illustrating flow in an conventional repository environment.

In overview, the present disclosure concerns software development, in which an application comprises different self-contained software components which are stored in a software repository, the software repository can support different applications, the developers can add to the software repository, and the software components are provided for use and re-use by developers. A way is provided to detect potential risks in software components and to prevent them from flowing inbound to the repository and/or prevent them from flowing outbound such as to an application or to be published or similar; the method and system can advantageously work in conjunction with a repository manager. By taking steps at critical junctures appropriate for software development to automatically block, quarantine, limit, or notify of software components that fail pre-defined criteria, and possibly by indicating reasons for failure and/or suggesting acceptable software components, the consumption (inbound flow) and publication (outbound flow) of software components that have risks which have already been deemed unacceptable for the repository or for the application can be reduced and/or prevented, dramatically reducing risky behavior and greatly improving overall software development efficiency.

More particularly, various inventive concepts and principles are embodied in systems, devices, and methods therein that acquire new software components, which sits between the organization and the supply of new software components and evaluates the new software components just before they arrive at the organization and/or just before software components which might make their way into the software repository or an application are released and/or just before they are otherwise disseminated to the software repository of an organization or in an application.

A concept is to allow the system to establish and utilize arbitrary criteria to pass or not pass the software component which may have risks. Such risks can be security vulnerabilities, e.g., whether a software component has security vulnerabilities, even if it passes security tests or vetting; and/or licenses which are required by the software component. If the software component has pre-defined risks, the system can take actions which correspond to the failure and/or which correspond to the type of risk, such as blocking the software component or other pre-defined programmatic steps discussed herein.

In overview, one or more embodiments can acts as a guard against pulling in an inbound software component that a developer otherwise would not be aware of that has problems, or is not compatible with company or organization policies, or the like. On the outbound side, a similar check can be made to make sure that outbound software components (which may be in the repository) pass the tests that have been established, which can be customized to particular applications. As an example of a license risk, if the system does not want to allow an Apache 2.0 or GPL V3 licensed items, those can be blocked. As an example of a security vulnerability, consider that a software component might have a vulnerability rated a low level but the application blocks only vulnerabilities at a critical level. Also, a policy can include variations such as to disallow components over a certain age, or under a certain age, or to disallow all open source components.

As further discussed herein below, various inventive principles and combinations thereof are advantageously employed to allow a user to establish policies that are appropriate for their system, in which a user can allow components with certain kinds of risks, and disallow others.

Further in accordance with exemplary embodiments, there is provided a method and system that resolve the issues mentioned above.

II. Problem Presentation and Observations

A repository manager provides facilities for managing an arbitrary number of repositories of software components. A typical repository manager has two primary flows.

The first flow acts as a caching proxy for another upstream repository (that is often part of another repository manager). In this flow, a client will request a particular software component from a local repository and the local repository will determine if the component requested is available. If it is available, the repository manager will provide the component to the client. If it is not available, the repository manager will fetch the component from a previously established upstream repository, cache the component locally (in a proxy repository) and then serve the component to the client.

The second flow allows the publishing of components by the repository manager's users to a hosted repository that is associated with a specific storage location within the repository manager. In this flow, a client will request that the repository manager store a software component in a preconfigured location. Once the component is uploaded and stored, the target repository can then become a distribution point for other consumers, similar to the proxy-cache form of repository.

Reference is now made to FIG. 1, a data flow diagram illustrating flow in a conventional repository environment. In FIG. 1, there is client A 101, client B 103, $1^{st}$ flow 107, $2^{nd}$ flow 109, repository manager 111, proxy repository 113, hosted repository 121, component and metadata 119 in the hosted repository, upstream repository 105, and component and metadata 117 in the upstream repository.

In $1^{st}$ flow 107, client A 101 requested software component (117 or 119) from the repository manager 111. The repository manager 111 determine if the component requested is available at the hosted repository 121. If requested component 119 is available at the hosted repository 121, the repository manager will provide the component 119 to client A. If requested component 117 is not available in the hosted repository 121, the repository manager 111 will fetch the component 117 from the upstream repository 105, cache the component locally (in the proxy repository 113) and then serve the component 113 to client A 101. The $1^{st}$ flow can be referred to as a caching proxy flow. This is a typical flow for a software component which is a third party, open source component that probably was made available for distribution by the upstream repository 105.

In the $2^{nd}$ flow 109, client B 103 requests that the repository manager 111 store a software component 119 in a preconfigured location, represented by hosted repository 121. Once the software component 119 is uploaded and stored, the hosted repository 119 can then become a distribution point for other consumers, typically developers in the organization that hosts the hosted repository 121, that might request components stored therein. This software component 119 could be a component that client B developed, or more recently it likely is a third party component that originated elsewhere by was inserted by client B into their own development environment before uploading.

Before the massive increase in the use of open source software, the number of third party software components used in the creation of applications was trivial. Additionally, the critically of these components was frequently low. As such, the risk that was assumed by an organization generally ignoring the quality of such third party software was trivial. However, as the usage of open source has grown, that dynamic has changed dramatically. For example, in 2000, the typical application was composed of less than 10% third party components. In 2015, the typical application is composed of 80%-90% third party components.

This change in the composition of applications has provided extraordinary benefits because software developers are able to leverage the diverse specialization and expertise which the open source software ecosystem can offer. The challenge with this now highly outsourced model is that the final responsibility for verification of quality still remains that of the team actually using the open source components. However, very limited tooling for such verification exists and there is nothing with any automated verification, let alone at critical junctures, of quality with pre-defined actions and possible remediation that the system and method discussed herein provides.

A common response to the challenge of preventing the use of inferior or flawed software components and applications is manual, human review of the software used. Often development teams have no knowledge of the suitability or acceptability of components. Some organizations have large, human resource intensive evaluation processes that perform a manual check of software components.

There are problems with the current approaches. They often result in significant delays as developers are forced to wait for approvals well prior to development and worse can lead to developer work-arounds which can entirely circumvent the review process. Because the pace of software development is continually increasing, processes that introduce delays often result in significant cost inefficiencies, ultimately undermining the developing organization's competitive advantage.

What is not working today, is that there are no controls in place, and what often happens is that the repository is disconnected from the Internet (inhibiting the access to the upstream repository) to enforce security, new components are reviewed manually well before development and those that pass are put into the repository for developers to use. The use of conventional checks is troublesome and spawns a variety of work-arounds and is not related to the ultimate product.

III. Aspects of the Approach

A. Concept

The solution to the problem discussed in the above section is one that enhances visibility and understanding of the software components, while resolving the above issues. Embodiments disclosed herein introduce the effective use of automation into appropriate points to enforce the quality verification process of third party and open source software components, as customized to the intermediate or end use of the software component, reducing delays and validation errors while adapting to typical developer behaviors such as using what they want. Because it is now possible to know the attributes and risks of software components in advance of storing in a repository and/or in advance of deployment, methods and systems disclosed herein can automatically process a user configurable, pre-defined policy which includes ruleset, using the available data for the components in question, and will take pre-defined, user-configurable actions as appropriate to the intended use of the software component by the developer(s). This results in significant improvements to development efficiencies due to reduction of the usual delays and errors and the avoidance of poor component selection decisions at appropriate points in the development process all while avoiding the need for developer work-arounds. Avoiding these early poor decisions, if possible, results in significant reduction in unplanned and unscheduled development work; checking at other appropriate points to ensure that poor component selection decisions have been avoided further enhances the development process.

In some situations, the developers may be retrieving the software components from the repository. Ultimately, the repository may just be reviewed as a software development file system. This system can be provided not just for the repository manager, but for any method/system by which developers are bringing in the software, which might be comparable to the repository. This system also can be provided for any developer deployment tools or tools for publishing applications or other integrated groupings of components.

In the context of a software development lifecycle, a repository manager can serve software components for various clients and development and operational tooling often with a combination of a proxy-cache form of repository as well as a local storage based repository (also commonly called "hosted repository"). Because the repository manager is central to the development lifecycle, it can be used as a convenient control point for ensuring the appropriate software components are being used.

B. Architecture

Figure 2:
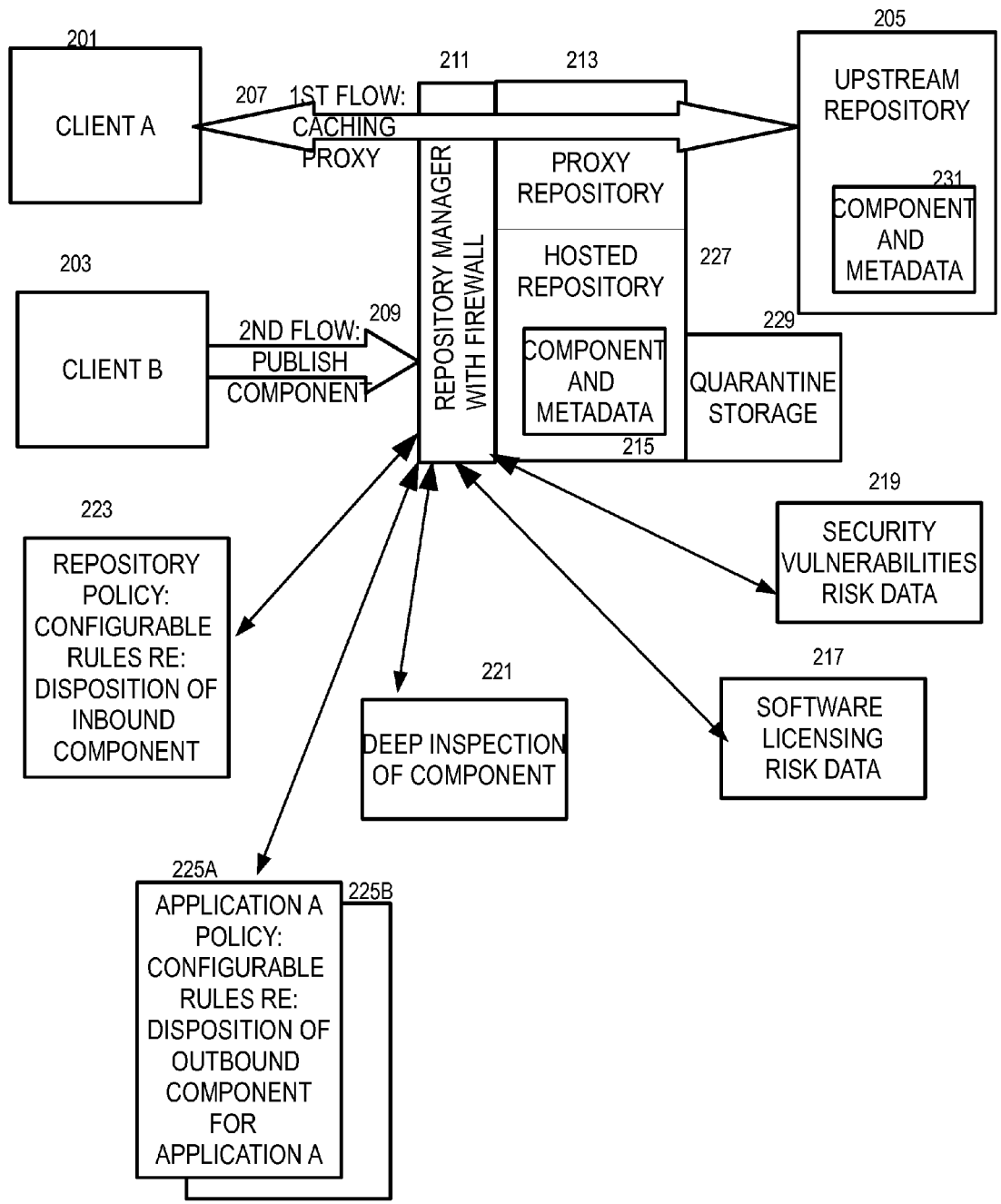
FIG. 2 is a data flow diagram illustrating flow in a computer system for controlling software for a repository environment.

Reference is now made to FIG. 2, a data flow diagram illustrating flow in a computer system for controlling software for a repository environment. FIG. 2 illustrates client A 201, client B 203, $1^{st}$ flow 207, $2^{nd}$ flow 209, repository manager with firewall 211, proxy repository 213, hosted repository 227, optional quarantine storage 229, and upstream repository 205. Components, here represented by component and metadata 215, are stored in the hosted repository 227. Components, here represented by component and metadata 231, are stored in the upstream repository 205.

In $1^{st}$ flow 207, client A 201 makes a conventional request for a software component (215 or 231) from the repository manager 211 which includes the firewall as further detailed herein. Because this is a development environment, it is assumed that the software component is specified as a canonical version, e.g., "ember-1.1.2-nupkg." The repository manager 211 determine if the component requested is available at the hosted repository 227. If requested component 215 is available at the hosted repository 227, the repository manager 211 will provide the component 215 to client A in accordance with the usual techniques. If requested component is not available in the hosted repository 227, the repository manager 213 will fetch the component 231 from the upstream repository 205. However, before possibly serving the component 231 to client A 201 and saving the component in the repository 227, the repository manager 211 will determine the risks of the component using risk data (here represented by security vulnerabilities risk data 219 and software licensing risk data 217) and determine whether the component 231 passes the rules already established in the repository policy 223 (regarding disposition of an inbound component). If the component 231 passes the repository policy 223, the repository manager will take the usual steps, for example, to cache the component locally (in the proxy repository 213) and then serve the component 231 to client A 201. If the component 231 does not pass the repository policy 223, then the actions established in the repository policy 223 to dispose of an inbound component which does not pass will be taken. As disclosed in more detail below, such steps can be one or more of the following, which are provided by way of example: block the component 231 from being served to client A, notify the client A 201 as to why the component 231 failed, move the component 231 into quarantine storage 229 (with the possibility of later moving to the hosted repository by waiver), proposing an alternative version of the component which is acceptable, performing a deep inspection 221 of the component to determine risks which partially match (e.g., risks of components included within the component) and repeating for the partial match, blocking a partial match, and variations and combinations of these, possibly stacked together. As a consequence, from the viewpoint of client A 201, the request for a component behaves identically to a conventional request—unless there is a risk. Moreover, if there is a risk, the developer at client A 201 can be provided options and information for selecting a component which will pass the repository policy.

In the $2^{nd}$ flow 209, client B 203 requests (as usual) that the repository manager 211 store a software component 215 in a preconfigured location, represented by hosted repository 227. There can be other reasons to cause an upload, such as noticed by a continuous integration (CI) process, or for a full or partial build of an application. As discussed in more detail below, the repository manager 211 determines whether the component passes the rules already established in the repository policy 223, or if the component is intended for an application, whether the component passes the pre-determined application policy 225A, 225B specific to the application. Once the software component 215 is uploaded and stored, and/or the application is built, the hosted repository 227 can then become a distribution point for other consumers. ** However, before possibly uploading the component, the repository manager 211 will determine the risks of the component using the risk data (e.g., security vulnerabilities risk data 219 and software licensing risk data 217) and determine whether the component passes the rules already established in the application policy 225A or 225B associated with the specific application (regarding disposition of an outbound component). If the component 231 passes the application policy 225A or 225B, the repository manager 211 will take the usual steps, for example, to store the component locally (in the hosted repository 227) and then make the build or component available to clients. If the component being uploaded or built does not pass the application policy 225A or 225B, then the actions established in the application policy 225A or 225B to dispose of an outbound component which does not pass will be taken. As disclosed in more detail below, such steps can be one or more of the following, which are provided by way of example: building anyway (appropriate for internal development use), block the component 231 from being used in the build or being uploaded, notify the client B 203 as to why the component failed, move the component into quarantine storage 229 (with the possibility of later moving to the hosted repository 227 by waiver), proposing an alternative version of the component which is acceptable to the application policy 225A or 225B, performing a deep inspection 221 of the component to determine risks which partially match (e.g., risks of components included within the component) and repeating for the partial match, blocking a partial match, and variations and combinations of these, possibly stacked together.

The repository manager 211 and its proxy and hosted repositories 213, 227 can act as local (e.g., high-speed network connectivity is available between communicating nodes) storage warehouse for software components that are parts of an application or even software components that are entire applications themselves. In the context of a software development and operations pipeline, this local parts warehouse provides for extremely high performance and reliable application builds, ultimately significantly improving overall development efficiency.

The repository manager 211 can be regarded as a common entry and exit point for software components (the parts used in the assembly of applications and the resulting applications themselves). It is an ideal point for the integration of a method/system to control potentially unacceptable software components.

Once the software component 215 is stored inside the repository 227, it is not re-evaluated and should not be later evicted. The reason is that a build depends on the continued existence of a software component in the library, and an eviction might result in a build breaking. Eviction can be done but it is not a good practice because eviction will introduce inefficiency and confusion on the part of the developers. The better practice is catch the component at the point of the build rather than trying to keep the software perfectly clean at all times. In this system, once the software component is stored in the repository 227, the software component is assumed to be clean enough.

The present method and system can be integrated into the flow paths (here represented by $1^{st}$ and $2^{nd}$ flow paths 207, 209) associated with software components in and out of the repository manager 211.

C. Risks, Policies, and Actions

Such a system and method can act on a set of rules embodied in policies 223, 225A, 225B that are predefined to establish what risks are deemed acceptable and what are not, and what actions to take for risks that do not pass. Components and applications that flow into and out of the software repository 213, 227, for example through the repository manager 211, can be evaluated for acceptability. When risks of a component or application are deemed acceptable, certain user configurable, pre-defined (programmable) actions can be taken, as defined in the pre-defined policy. When risks of a component or application are deemed unacceptable, a different set of actions can be taken, also as defined in the pre-defined policy, which is often to prevent delivery or storage of the unacceptable component or application. However, actions are possible depending on the behavior that users of the system desire.

By taking a predefined action in response to whether or not risks of a component or application are deemed acceptable, it is possible to automatically prevent the use of inferior or flawed software components, meanwhile providing instantaneous feedback to the developer about what is wrong or what can be done better.

This can provide an extremely scalable form of control, dramatically reducing development costs and application portfolio risk, and significantly improving overall development and operational efficiency and developer behavior.

1. Risks

Components entering the repository for any reason can be automatically analyzed and matched with risk data available on the component. Risk data can include risks such as security vulnerabilities, software licensing details, and/or other details from the metadata that might be associated with the component.

The method and system can extract, according to known techniques, from the component's metadata, known "markers" that are used to uniquely identify the component. The identification of the component can be used to lookup information associated with that component (i.e. can be matched to a risk). For example the security vulnerabilities risk data 219 can associate an identification of the component with security risks which have been reported (as is known) for the component. As another example, the metadata of the software component can list one or more licenses which are required by the software component; or the identification of the component can be used to lookup licenses associated with the component, for example, the software licensing risk data 217 can associate an identification of the component with licenses which inhere to the software component. In this example, the processes are implemented in the repository manager 211, but can be separate from the repository manager, for example, implemented as a data service. Techniques are known for identifying security vulnerabilities associated with a software component, and for identifying licenses associated with a software component.

The type of risks evaluated need not be limited to security vulnerability and software licensing. Any arbitrary data can be attached to a known component. If data is attached, the system can evaluate that data and take action on it. With regard to security vulnerabilities, the rules reference the security vulnerabilities risk data which are reported as matching the software component. With regard to software licensing, the rules reference the software licensing details which are reported as matching the software component.

Software developers typically pull in a software component from any of various sources. As is known, a software component always has metadata. A table can be provided, which inputs a unique identifier (for example, a lookup fingerprint, sometimes referred to herein as a lookup key) for the software component, and which feeds back the risks which match the fingerprint. This information on the risks which match the software component are used as part of the evaluation. For the license, the system can identify the component and create a fingerprint unique to the component (e.g., based on a hash value using conventional techniques), which is the lookup key, which is used to look up information indicating the licenses associated with that component.

The following is a simple, abbreviated example of the security vulnerabilities risk data 219, which is not intended to be comprehensive but is intended to suggest variations:

TABLE 1

Example Security Risks

| File | Highest Security Vulnerability |
|---|---|
| commons-fileupload | Moderate |
| org.apache.httpcomponents | Low |
| org.apache.tomcat:tomcat-util | Severe |
| ember-1.1.2-nupkg | Low |

The following is an abbreviated example of the software licensing risk data 217, which is not intended to be comprehensive but is intended to suggest variations:

TABLE 2

Example Software License Risks

| File | Software licenses |
|---|---|
| commons-fileupload | GPL, Apache 2.0, MIT license |
| org.apache.httpcomponents | GPL, Apache 2.0 |
| org.apache.tomcat:tomcat-util | GPL, Apache 2.0 |
| ember-1.1.2-nupkg | Unidentified |

An open source project tends to depend on other things to be folded in so there might be, for example, an APACHE license which might be combined with BSD, and CDDL 1.0, optionally selecting CDDL 1.0 or GPL. The combination of licenses can be determined and stored into the software licensing risk data 217 storage.

In many situations, the software licensing risk data may be available directly in the software component or its metadata.

As can be seen above, the software component is matched to its risk data.

2. Policy and Risks Vs. Actions

The risks which are matched to the software component are evaluated against a pre-defined policy previously prepared from a set of pre-defined configurable rules to determine the disposition of the component. The software component can be deemed to pass or to fail the acceptable criteria based on the risks to which the software component is matched. A pre-determined set of do-not-pass actions, or pass actions, already configured, can then be taken depending on whether the component passed or did not pass, as is discussed in the subsequent section.

Configurable rules can be stored in the policies 223, 225A, 225B. The policies are user configurable based on pre-defined rules. The rule associates a risk with an action and a disposition. A disposition can be pass or fail (does not pass), although it is possible that other dispositions can be provided. For a component that does not pass, the system can take pre-defined programmatic steps; whereas for a component that passes, the system can follow the normal process, e.g., store component, build application, etc. For example, given a known piece of metadata about a component, there can be provided a list of known security vulnerabilities risks; assume that the rule, is if the security vulnerability is greater than a pre-determined level, then the component fails. As another example, a rule can be that if the software component matches any of specified software licenses (e.g., GPL, EGPL), it passes (or alternatively fails). These rules can be stacked up to implement the policies so as to handle multiple risks which match a single component, where the action followed is the most restrictive action.

The following is a simple example of rules specified in an example repository policy or application policy, which is not intended to be comprehensive:

TABLE 3

Example Policy

| Risk | Action |
|---|---|
| Apache 2.0 license | Pass |
| GPL license v.2 | Pass |
| MIT license | Does not pass |
| BSD 3.0 license | Does not pass |
| Unidentified license | Does not pass |
| Severe security threat | Does not pass |
| Moderate security threat | Pass |
| Low security threat | Pass |
| Unscored security threat | Does not pass |

The system can be set so that a component does not pass if it has any risk which does not pass.

The illustration of FIG. 2 provides a policy for the repository 223, and a different policy 225A, 225B for each of different applications. It is expected that the application policies are subsets of the repository policy. For example, GPL components might be allowed into the repository according to the repository policy, but a particular application might not be appropriate for GPL, so the repository manager 211 will not pass the component under a particular one of the application policies but would pass the component under a different one of the application policies.

3. Policy and Programmatic Steps for Do-Not-Pass Actions

Today's organizations try to integrate and build often, which allows the system to frequently evaluate whether the application (or a grouping of some of the components in the application) passes the policies at each point of a build, for example. Alternatively, or in addition, the system can evaluate just prior to releasing. These can be set up at various points in a development work flow with a corresponding and potentially differing set of preconfigured actions for each point.

The repository manager 211 can utilize the policies to enforce the policy at different stages in the development-release process. The same programmatic steps can be utilized at all stages in the development-release process. Alternatively, the policies can specify different programmatic steps at the different stages, which are considered to be different enforcement points. For example, a policy can specify programmatic steps for does-not-pass actions at each of the enforcement points; other examples of programmatic steps are possible. This flexibility allows for the ideal actions to occur in the context where policies are violated leading to more efficient and effective control of the development process.

The policy can specify the programmatic steps for the does-not pass action, which correlates the stage of enforcement to the programmatic steps. The following is a simple example of pre-defined programmatic steps for the does-not-pass action, which is not intended to be comprehensive but which is intended to suggest variations.

TABLE 4

Example Does-not-pass actions

| Stage of Enforcement | Block | Quarantine | Quarantine, optional Waiver | Warn | Suggest Alternative |
|---|---|---|---|---|---|
| Develop | | | XX | XX | XX |
| Build | | XX | | XX | XX |
| Stage Release | XX | | | XX | XX |
| Release | XX | | | XX | |
| Operate | XX | | | | |

The stage of enforcement can be determined from, for example, the developer environment tool which causes the component to be evaluated. For example, a request for a new component from the repository manager can be regarded as a "develop" stage of enforcement, a continuous integration (CI) tool which initiates the evaluation can be regarded as a "build" stage of enforcement, a build tool which initiates the evaluation for an internal test can be regarded as a "stage release" stage of enforcement, a build tool which initiates the evaluation for an application release can be regarded as a "release" stage of enforcement, and any attempt to re-create a release which was previously released can be regarded as an "operate" stage of enforcement.

Note that a user can configure the actions rather simply by modifying the pre-defined programmatic steps, and combinations thereof. Also, the programmatic steps are discussed in more detail herein.

One common action in the case that a component did not pass is to block the component from being served to users, though other pre-defined, user-configurable actions is supported.

The repository manager 211 is conventionally used to publish new and updated applications. In operation, it is good practice that an application which fails the application policies will not be published, with accompanying errors and notifications so that the application can be fixed.

If desired, pre-defined programmatic steps can be specified for a pass action, along the lines described above in connection with the does-not-pass action.

4. Deep Inspection

In addition to data already known about components (because the components have previously been encountered), a deep inspection 221 of software components internal to the software component can be performed such as when a component is not already known, to identify components which are already known and which are internal to the unknown component. Tools like Static Application Security Testing (SAST) and Dynamic Application Security Testing (DAST) are examples. A deep inspection to identify internal components is disclosed in U.S. Pat. No. 8,825,689, assigned to Sonatype, Inc.

With regard to a "deep inspection" 221 of a component, much of the previous sections deals with known canonical versions of components, which are bit-for-bit replicas of original versions from suppliers. In some cases, however, developers modify or fix parts of software components resulting in slight modifications from the original components, so that the component cannot be identified easily.

The deep inspection 221 identifies internal components, in the event that a component cannot be identified. For example, using known techniques, the similarity to an original component can be scored, and the score can be incorporated part of the repository policy 223 or application policy 225A, 225B. In other words, if something is not a 100% match to an original component, it might fail (perhaps there is a back door, or a Trojan horse). Deep inspection is for something which is not identical to but similar to known components. In this way, a component that is not a 100% match to an original component may be evaluated under the pre-determined policy which is being applied to that original component.

The policy can pre-determine how to handle a partially matching component. If a component is an exact match, the policy can be faster to apply than when a component is not an exact match and a deep inspection is performed on that component. When the deep inspection 221 is performed for a software component, the system starts at the outermost layer of the software component, and attempt to identify the fingerprint of the layer. If that fingerprint is not known, the system breaks that outermost component into the components in the next inner layer and attempts to identify the fingerprint of each of the components in that next inner layer. When the components are identified at a layer, the evaluation is done. Until then, the deep inspection 221 continues recursively.

Generally speaking, it is anticipated that most of the components will be known but there will be some outliers. If there is one (or more) thing which is different, that is when the partial matching algorithm and the scoring comes into play, followed by application of the policy to each of the components which is identified.

Whether the software component passes or fails is determined by the composite of the risk data for the internal components.

In addition, each of the policies can, for a component which is a partial match, how much it must match or it will be failed; for example, if a component which partially matches is not at least an 80% match, it can be failed. When, for example, the outermost layer matches, then there is no need to inspect deeper because the system has previously identified all of the information for all of the components (including interior components at every layer) within the software component that matched.

5. Quarantine

In some implementations, a software component 231 which is inbound but fails the repository policy 223 can be placed into quarantine storage 229, and the fact that the software component is in quarantine is also stored such as in a log. Subsequently, a requested software component can be checked against the quarantined software component log so that there is no need to check against the user-defined policies or to do a deep inspection to fail the requested software component which is already quarantined.

When a software component is blocked it may be placed into quarantine, which allows a user can evaluate the quarantined software component more deeply. In some implementations, the quarantine can be waived which includes a user expressly moving the software component from quarantine storage 229 into the repository 227. This allows a software component that fails the broad, general policies, to be included into the repository on its own merits for reasons not captured in the policies.

IV. Detailed Description of Components and Flow

Figure 3:
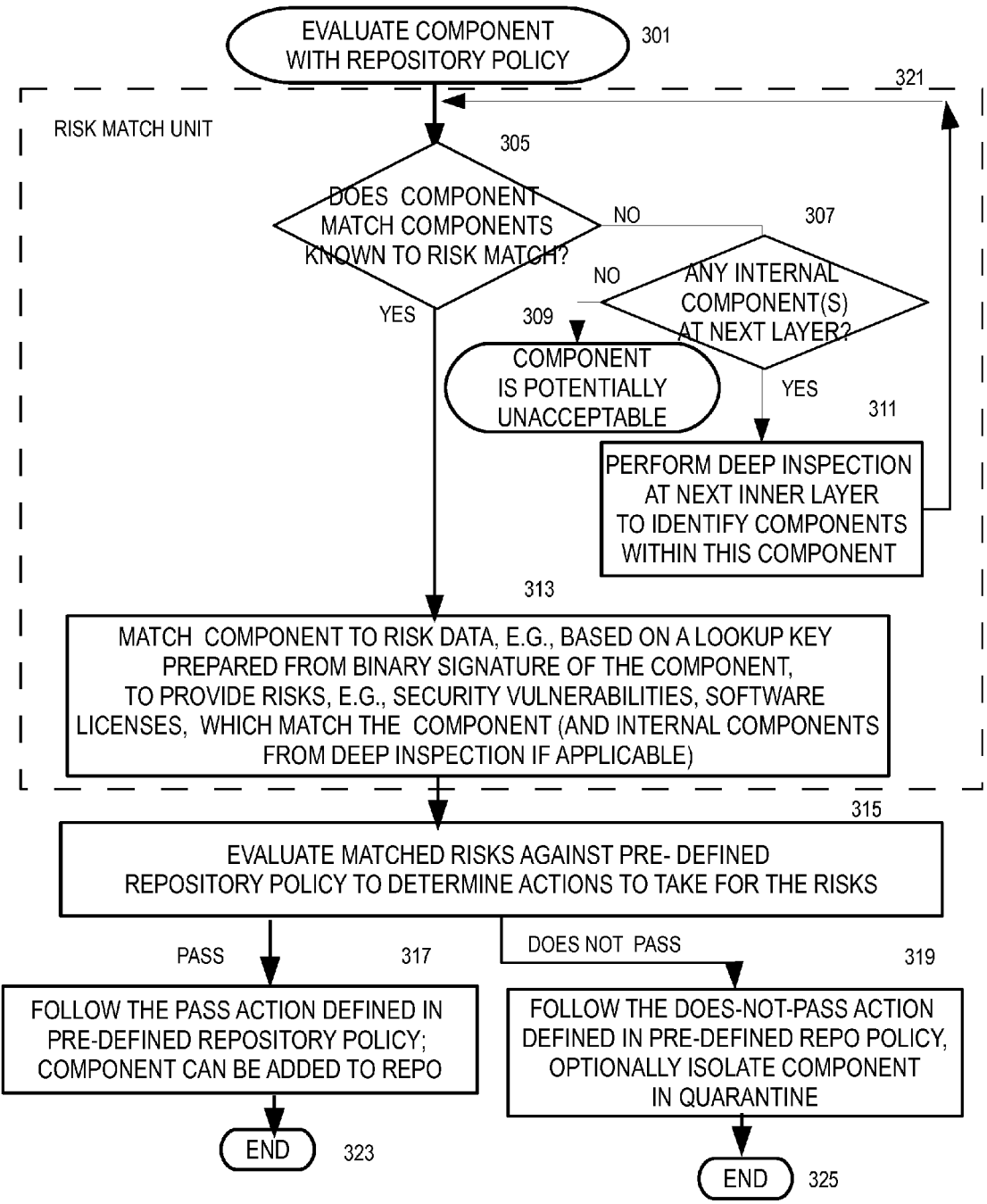
FIG. 3 is a flow chart illustrating a procedure to evaluate a component with a repository policy.
Figure 4:
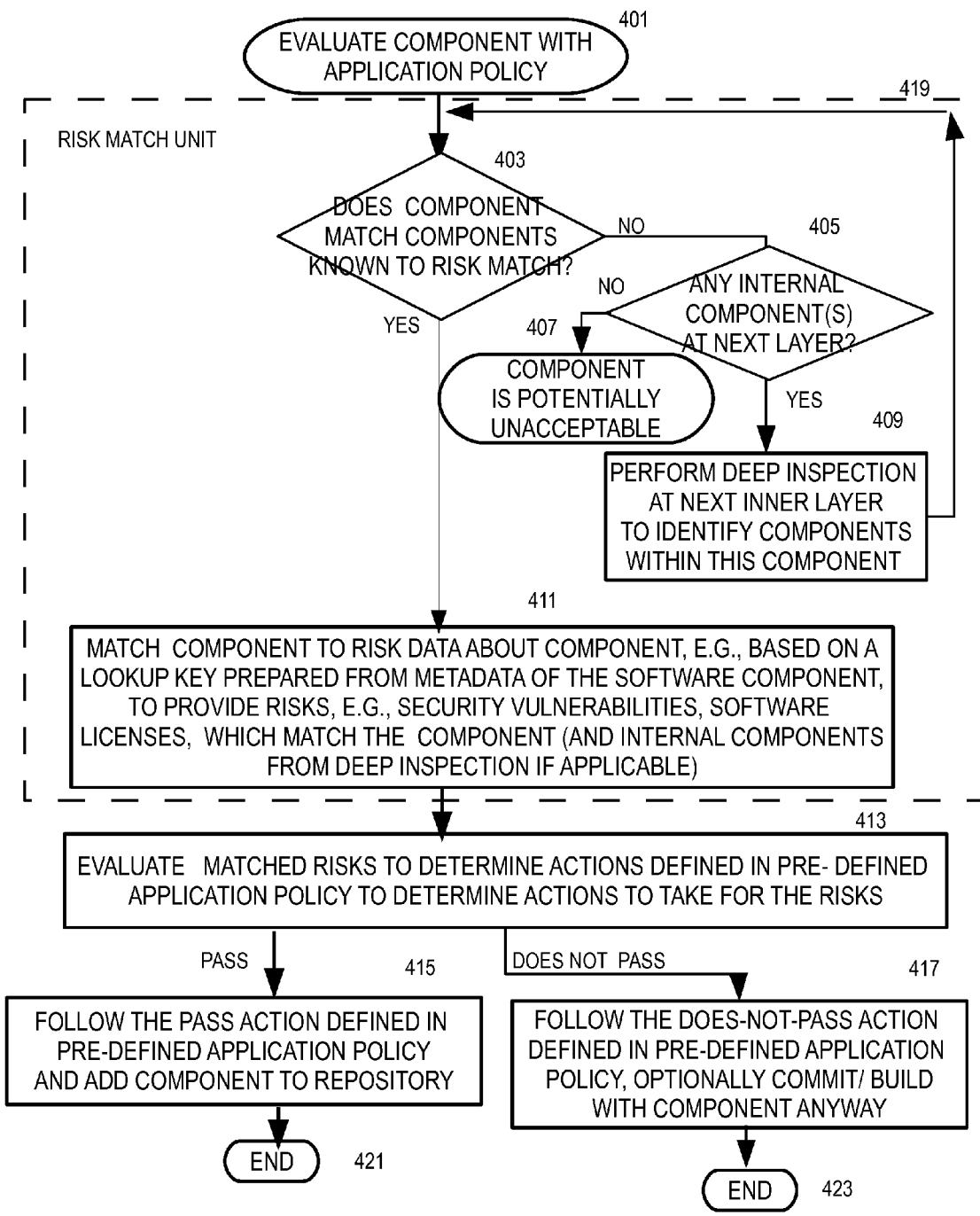
FIG. 4 is a flow chart illustrating a procedure to evaluate a component with an application policy.
Figure 5:
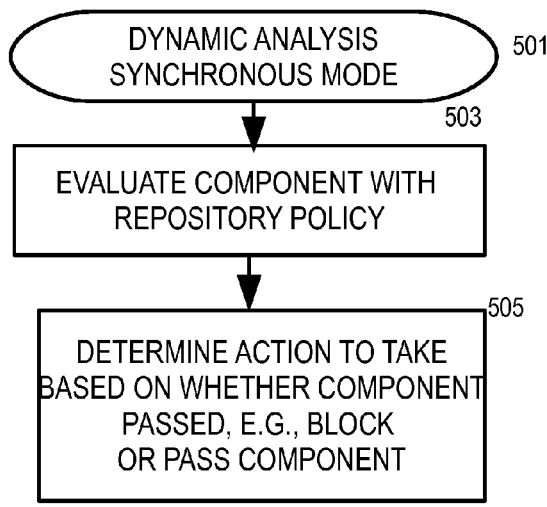
FIG. 5 is a flow chart to illustrate a dynamic analysis synchronous mode.
Figure 6:
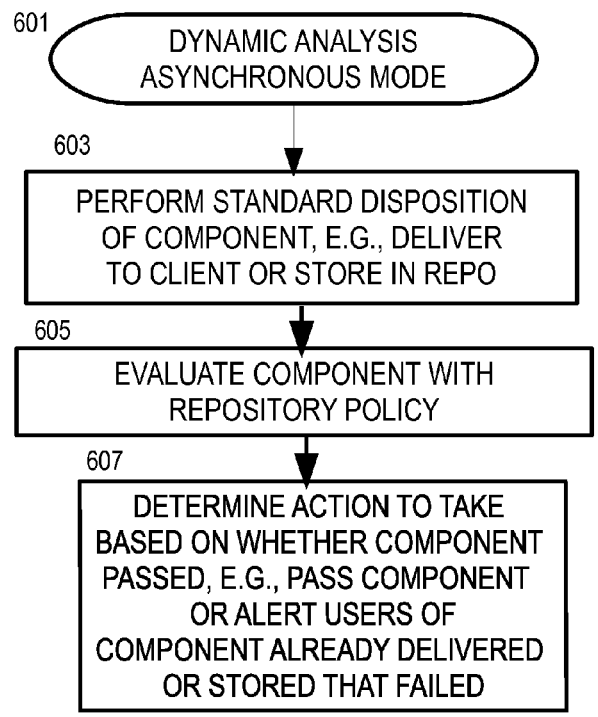
FIG. 6 is a flow chart to illustrate a dynamic analysis asynchronous mode.
Figure 7:
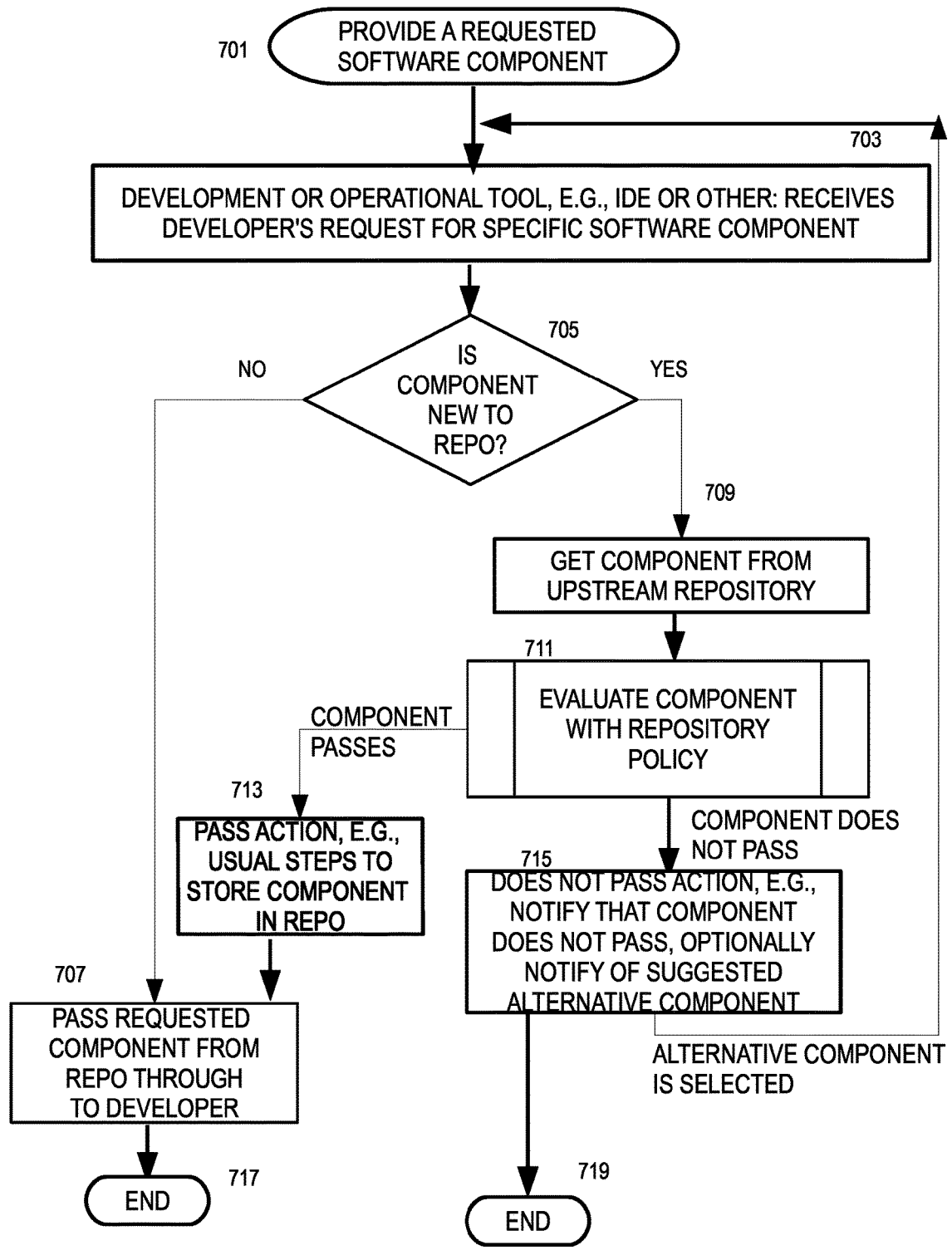
FIG. 7 is a flow chart illustrating a procedure to provide a requested software component.
Figure 8:
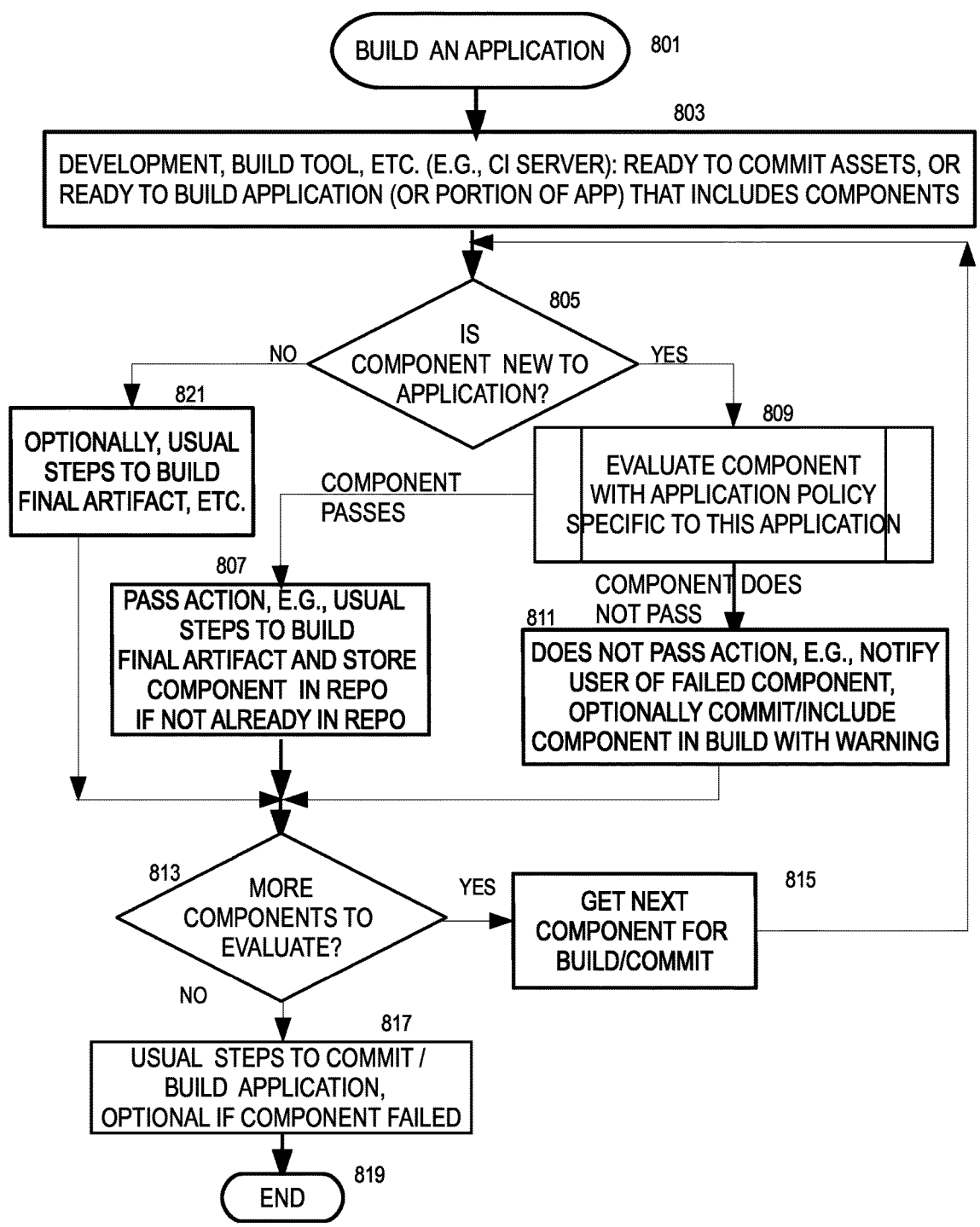
FIG. 8 is a flow chart illustrating a procedure to build an application.

The overall design disclosed herein can allow the evaluation to be incorporated into a repository manager, or can be incorporated into other development and/or build tools. FIG. 3 FIG. 4 illustrate evaluation of an inbound component (to the repository) and an outbound component (e.g., to an application), respectively. The inbound component is evaluated with a repository policy as further described in connection with FIG. 3. The outbound component (or components) which is intended for a particular application is evaluated with an application policy particular to the application as further described in connection with FIG. 4. FIG. 5 and FIG. 6 illustrate a variation in which the analysis against the policy is synchronous (e.g., the component is evaluated and the action is taken before the component is disposed of) as in FIG. 5, or is asynchronous (e.g., the component is evaluated and the action is taken after the component is already handled according to the standard disposition) as in FIG. 6. FIG. 7 and FIG. 8 illustrate how the inbound or outbound flow of FIG. 3 and FIG. 4, respectively, is kicked off from a development and/or build tool.

The data flows are illustrated herein by way of example to further understanding of the principles discussed here. Actual implementations can omit one or more portions of the data flows, and/or can include other data flows which are within the scope and spirit of the discussion herein.

Reference is now made to FIG. 3, a flow chart illustrating a procedure 301 to evaluate a component with a repository policy. In FIG. 3, the procedure 301 includes a risk match unit 321. In the risk match unit 321, the procedure 301 determines 305 whether the component to be evaluated is a component already known to have been evaluated for risk matches, meaning whether the component was evaluated for risks.

If the component is known to have already been evaluated for a risk match (305→Yes), then the procedure 301 will attempt to match 313 the component to risk data. For example, a hash or binary signature of the component can be used to prepare a lookup key using known techniques. Then, based on the lookup key, the risks (such as security vulnerabilities and/or software licenses), if any, which match the component can be determined. It should be noted that any data available in the metadata can be used to determine a variety of risks.

If the component is not known to match a risk (305→No), then some embodiments of the procedure 301 can include a deep inspection. The software components internal to the component being evaluate are evaluated, layer-by-layer, until components are already known. In the deep inspection, the procedure 301 will determine 307 whether there are any internal components at the next layer within the software component. If there are internal component(s) at the next layer, a deep inspection will be performed to identify components within the component being evaluated. The component(s) identified at the next layer are then evaluated, recursively, for risks. If there are no internal components at the next layer, the procedure 301 will indicate that 309 that the component being evaluated is potentially unacceptable, because after the evaluation the component and its internal components (if any) have not already been encountered. The risks of the component, determined via the deep inspection, include the risks of the components within this component. For example, sometimes, organizations rebuild open source components with minor modifications. These changes result in the component not matching the canonical version. When this happens, the deep inspection can be used to determine if the component is "similar" to a known component. A score can be assigned based on how similar it is. This score is effectively another piece of data associated with the component that can be evaluated as part of the ruleset. For example, some users might decide that only known components can be used or perhaps a component that is a partial match (e.g., 80%, 90%, 99% match is OK. Because of this, it is possible to have, for any one component submitted for evaluation, a partial match, an exact match or a non-match. A, "match state" is either true or false, and a "partial match score" has some value less than 100%.

Once the procedure 301 has determined the risks that match the component (and, if deep inspected, the risks of components within this component), the matched risks are evaluated 315 against the pre-defined repository policy to determine actions to take for the risks. If the risks are all determined to "pass," according to the repository policy, then the procedure 301 will follow 317 the pass action defined in the pre-defined repository policy. The component that passes the repository policy is deemed to be acceptable and can be added to the repository as usual. The component which has a risk that does not pass the repository policy is deemed to be unacceptable and can follow 319 the does-not-pass action defined in the pre-defined repository policy, namely, any pre-defined programmatic steps for the does-not-pass action. Optionally, as discussed above, the pre-defined programmatic steps for the pass action and/or the does-not-pass action can be defined based on the stage of the developer tool.

Reference is now made to FIG. 4, a flow chart illustrating a procedure to evaluate a component with an application policy. In FIG. 4, the procedure 401 includes a risk match unit 419. In the risk match unit 419, the procedure 401 determines 403 whether the component to be evaluated is a component already known to have been evaluated for risk matches, meaning whether the component was evaluated for risks.

If the component is known to have already been evaluated for a risk match (403→Yes), then the procedure 401 will attempt to match 411 the component to risk data. For example, a hash or binary signature of the component can be used to prepare a lookup key using known techniques. Then, based on the lookup key, the risks (such as security vulnerabilities and/or software licenses), if any, which match the component can be determined. It should be noted that any data available in the metadata can be used to determine a variety of risks.

If the component is not known to match a risk (403→No), then some embodiments of the procedure 401 can include a deep inspection, which is similar to that discussed in connection with FIG. 3. The software components internal to the component being evaluate are evaluated, layer-by-layer, until components are already known. In the deep inspection, the procedure 401 will determine 405 whether there are any internal components at the next layer within the software component, which are evaluated recursively 409. If there are no internal components at the next layer, the procedure 401 will indicate that 407 that the component being evaluated is potentially unacceptable, because after the evaluation the component and its internal components (if any) have not already been encountered. The risks of the component, determined via the deep inspection, include the risks of the components within this component.

Once the procedure 401 has determined the risks that match 411 the component (and, if deep inspected, the risks of components within this component), the matched risks are evaluated 413 against the pre-defined application policy to determine actions to take for the risks. If the risks are all determined to "pass," according to the application policy, then the procedure 401 will follow 415 the pass action defined in the pre-defined application policy. The component which has a risk that does not pass the application policy is deemed to be unacceptable and can follow 417 the does-not-pass action defined in the pre-defined application policy, namely, any pre-defined programmatic steps for the does-not-pass action. Optionally, as discussed above, the pre-defined programmatic steps for the pass action and/or the does-not-pass action can be defined based on the stage of the developer tool.

FIG. 5 and FIG. 6 illustrate a synchronous mode and an asynchronous mode variation, respectively, for handling the rules evaluation and performance of the action.

Referring now to FIG. 5, a flow chart to illustrate a dynamic analysis synchronous mode will be discussed and described. In the synchronous mode process 501, the evaluation 503 of the component with the repository policy is performed, and the process 501 determines 505 which action to take (for example, blocking or passing the component), before the standard disposition of the component can occur.

Referring now to FIG. 6, a flow chart to illustrate a dynamic analysis asynchronous mode will be discussed and described. In the asynchronous mode process 601, the standard disposition of the software component is performed 603, which may for example result in delivery to a downstream requesting client. In parallel with the standard disposition 603, or some time after the standard disposition 603, the evaluation 605 is performed followed by determining 607 the action correspond to the risks of the software component.

If the asynchronous mode variation is used, components (which may or may not be acceptable) are allowed to be served to users of the repository manager via performance 603 of the standard disposition. Then, the asynchronous procedure 601 evaluates 605 the component with the repository policy. Upon completion of the evaluation 605, the procedure 601 determines 607 the action to take based on whether the component passed or not, for example, the action may be to alert, such as via e-mail, a set of users, for example that a component already delivered actually failed the policy.

Reference is now made to FIG. 7, a flow chart illustrating a procedure to provide 701 a requested software component. FIG. 7 illustrate a flow for the inbound component in the context of an Integrated Development Environment (IDE). It will be appreciated that other development tools can be used instead of an IDE. In FIG. 7, an evaluation of the component 711 with the repository policy corresponds to FIG. 3, discussed above.

The procedure 701 to provide a requested software component can be initiated with, for example, a development or other operational tool used by a developer receives 703 a developer's request for a software component; the software component which is specified is a canonical (usually a numbered) version. The procedure 701 determines 705 whether the component is new to the repository into which it will be placed as a result of the developer's request for the component. Such a repository could be a formal hosted repository, or even less formally a designated collection of software components which are intended for developers.

If the component is not new to the repository (705→No), then procedure 701 takes the usual actions for components which are in the repository. For example, the requested component is retrieved from the repository and passed through to the developer, for example, via the development or operational tool.

If the component is new to the repository (705→Yes), then the procedure 701 will get 709 the component from the upstream repository. Techniques are known for retrieving components from an upstream repository. Then, the component which has been retrieved from the upstream repository is evaluated 711 with the repository policy, for the repository into which the component will be placed. An example of the evaluation 711 is provided in FIG. 3. The evaluation 711 with the repository policy will return an action for the component according to the policy, namely that the component passes or does not pass the policy.

If the component passes the repository policy (711→component passes), then the procedure 701 will take the usual steps 713 for components which are not in the repository. For example, the requested component is stored in the repository and passed through to the developer, such as via the development or operational tool.

If the component does not pass the repository policy (711→does not pass), then the procedure 701 will take the programmatic steps 715 which are predefined in the repository policy. For example, such programmatic steps may include one or more of the following: block the component from being stored in the repository, notify the requestor that the component does not pass, notify an administrator of a failed attempt and the component, notify the requestor of a suggested alternative component that passes the repository policy, and/or similar. A notification that a component does not pass can include the risks identified in the component, which can assist in determining a better component to use. In some embodiments, the requestor can select an alternative component to request in place of the originally requested component; if so, the process 701 will evaluate 703-719 the alternative component as the requested component. The procedure ends 717, 719 when the pass action or does not pass action is taken.

In some variations, the procedure stores a log of fingerprints for components which do not pass. The procedure can check whether the component, which is not in the repository, is in the log of fingerprints for components which do not pass, can skip the evaluation 711 of the component with the repository policy, and take the specified does not pass action 715.

It should not be necessary to store a log of fingerprints which pass, because such components should have previously been stored in the repository and hence will not be new to the repository. However, if preferred a counterpart log of components which pass can be retained.

Reference is now made to FIG. 8, a flow chart illustrating a procedure to build an application. FIG. 8 illustrate a flow for the outbound component (or components) in the context of a build, which could be for example, a build tool, a development tool, a continuous integration (CI server) or the like. It will be appreciated that other development tools can be used, in which the intention is that the component(s) are destined for a particular application, as in publishing, a release, a build, or similar (understood as outbound from the developer). In FIG. 8, an evaluation of the component 809 with the application policy corresponds to FIG. 4, discussed above.

The procedure 801 to build an application can be initiated when, for example, a build tool or development tool or other operational tool is instructed that assets are ready to commit, or an application (or portion of application) which includes components is ready to build. A convenient example of a build or development tool is a continuous integration (CI) server. The software component(s) which are the ready-to-commit assets or which are specified in the build (or partial build) are canonical versions, and the application is also a specified version. The procedure 801 determines 805 whether the component is new to the application into which it will be included. The component may (or may not) already be in the repository. The component may (or may not) be appropriate for the application based on the application policy.

If the component is not new to the application (805→No), then procedure 801 takes the usual actions 821 for components which have already been used in the application. For example, the usual steps to build the final artifact, to be included in the application, or the like, are taken, via the development or operational tool.

If the component is new to the application (805→Yes), then the procedure 801 will evaluate 809 the component with the application policy, for the application into which the component will be built. An example of the evaluation 809 is provided in FIG. 4. The evaluation 809 with the application policy will return an action for the component according to the policy, namely that the component passes or does not pass the policy.

If the component passes the application policy (809→component passes), then the procedure 801 will take the usual steps 807 for that that component, for example, to build the final artifact to be included in the application; the procedure 801 will also store the component in the repository if it is not already in the repository.

If the component does not pass the application policy (809→does not pass), then the procedure 801 will take the programmatic steps 811 which are predefined in the application policy. For example, such programmatic steps may include one or more of the following: notify a user of the failed component, optionally commit the failed component anyway, optionally include the component in the build with a warning of the risk. As illustrated in FIG. 7, it is also possible to notify a user of a suggested alternative component that passes the application policy, and/or similar, and the suggested alternative might be selected and used instead of the failed component. A notification that a component does not pass can include the risks identified in the component, which can assist in determining a better component to use.

The procedure 801 will determine 813 whether there are more components to evaluate for a build, commit, or the like; such procedures normally include multiple components in a single build or commit with regard to the same application. If there are more components to evaluate (813→Yes), the procedure 801 will get 815 the next component for the build or commit, and will repeat the evaluation for the next component.

If 813 there are no more components to evaluate for the build, commit, or the like, and if the component(s) are all passed, the procedure 801 will take the usual steps 817 to commit and/or build the specified application. Note that the procedure 801 optionally can take the usual steps 817 to commit and/or build the specified application even when there are components which do not pass. The application policy can specify whether or not to build anyway if there are components that failed.

Techniques are known for the usual steps to commit/build an application, to build the final artifact, and the like. The procedure ends 817 when the build occurs (or is skipped) after all of the components are evaluated.

In some variations, the procedure stores a log of fingerprints for components which do not pass the application policy. The procedure can check whether the component, which is not new to the application, is in this application's log of fingerprints for components which do not pass the application policy, can skip the evaluation 809 of the component with the application policy, and take the specified does not pass action 811.

A log of components which pass the application policy can be retained.

V. Examples and Variations

The following example use-cases, example of policy administration, and some variations, are well suited to demonstrate various implementation details and advantages. As will be appreciated, this system can prevent the poor decisions by the developers up front, and it can also reduce the risk profile across a development environment by having better hygiene up front.

A. Inbound Use Case—New Component Passes the Policy

Consider an example in which a developer requests a component which is new to the repository and, unbeknownst to the developer, passes the repository policy. The fact that the component is new and passes the policy is transparent to the software developer.

In this example, there is an existing environment that uses a repository manager with the present system and method disclosed herein. From the developer's viewpoint, the developer requests, via an IDE for example, a new component which may not have previously been retrieved into this repository, and the developer is delivered the component (because it passes the policy). What is transparent to the developer is that the IDE requests the component from the repository, the repository knows that it does not have the component locally so the repository gets the requested component from the upstream repository (according to known techniques); then, before the repository provides the component to the requesting developer, the system and method herein will evaluate the repository policy, and if the component passes, then typically (per the policy) the repository manager is allowed to store the component locally and to deliver the software component to the developer that requested it. The present system and method is totally transparent to the developer when the component passes the policy.

By comparison, in the conventional technique such as a blacklist banning the component, the developer is not allowed to retrieve the component for the reason that it has never been previously approved. Probably the developer then requests permission for the particular component triggering a manual workflow which is typical slow and often introduces significant development inefficiencies due to the lack of automation and the corresponding manual actions that must be performed. If permission has been granted, the developer will retrieve the component; but if permission has not been granted, the developer will probably try another version or perhaps far worse, may attempt to circumvent the conventional process completely by downloading the component by other means and using it regardless. Such circumvention is fairly common practice as developers are simply trying to get their work done without understanding they might be violating the manual process.

B. Inbound Use Case—New Component Fails the Repository Policy

Consider an example in which a developer requests a component which is new to the repository and, unbeknownst to the developer, the software component is not acceptable for the repository. The fact that the component does not pass the policy is promptly notified to the software developer, and in this example includes the reasons why the software component fails.

In this example, again there is an existing environment that uses a repository manager with the present system and method disclosed herein. In this example, the repository policy does not accept a software component with an MIT license, or a severe security threat; everything else is accepted. The developer will request a software component, but the developer is unaware of, or does not care about, licenses or security threats for this software component, or even whether the software component might be in the software repository. From the developer's viewpoint, the developer requests, via an IDE for example, the canonical version of the component; the developer is notified that the component is not acceptable because it requires, for example, an MIT license and because it has a severe security threat (the reasons that the component does not pass the policy). What is transparent to the developer is that the IDE requests the component from the repository, the repository gets the requested component from the upstream repository (according to known techniques); then, before the repository provides the component to the requesting developer, the system and method herein will evaluate the repository policy, and if the component does not, then typically (per the policy) the requested component is blocked from being stored and the developer that requested the component is notified of the failure and the reasons that the component did not pass. The present system and method informs the developer of all of the reasons that the component does not pass the policy, so that the developer promptly can make an appropriate decision about a component that better avoids all of the risks presented by the requested software component.

By comparison, in the conventional technique, the developer is not allowed to retrieve the component for the reason that it is new. Then, the developer then requests permission for the particular component. If permission is not granted, the developer will probably try another version. However, the lack of permission might (or might not) indicate one reason for failure; a replacement version selected by the developer might resolve one risk but the others will remain. The conventional technique encourages developer behavior which bypasses the need to request permission.

C. Outbound Use Case—Failsafe

Normally, a developer obtains components by requesting the component through a repository manager, as discussed for example in connection with FIG. 7. Normally, the inbound components now stored in the repository previously passed the repository policy. However, outbound components are evaluated, which provides a failsafe mode for components which bypassed the inbound evaluation, perhaps by a developer that intentionally circumvented the prior blocking of one or more components.

The following example assumes that a developer that wants to use a particular component, but for any reason evades the controls provided by the repository manager on the inbound side, for example, by using a thumb drive and committing a software component to the version control system. In this example, the software component which was committed by the developer has an MIT license and a severe security threat. In this example, the software repository policy and the application policies will not pass a component that requires an MIT license or which has a severe security threat.

When the collection of components including the committed component (with the MIT license and severe security threat) is published, the software that is to be released is evaluated pursuant to the policy. (The policy for the outbound case can be associated with the repository, or with the organization at large, or can be associated with application and not necessarily with the organization at large.) Consequently, when the application is built, even this component with the MIT license and the severe security threat, which evaded the inbound policy evaluation, is evaluated anyway against the outbound policy. Here, the component that evaded the inbound policy is not acceptable according to the outbound policy. As prescribed by the pre-defined programmatic steps for a does-not-pass action, the system can provide a notice of a component that is unacceptable, provide a notice of the risks that were found in the component, provide a notice of a build which has risks and perform the build anyway, and/or can block the build.

By comparison, in the conventional system, the fact that the license is unacceptable and that the build incorporates a corresponding license threat likely is not noticed, if at all, until after the application is released causing the intellectual property risk to immediately manifest.

D. Outbound Use Case—Typical

The following assumes a typical scenario in the software development process when there is an application to be released. When a developer acquires components or binary assets, the developer generally pulls them into their IDE (integrated development environment, e.g., Eclipse or ID, or the like), as is known. Then the developer updates some of their local source code, which likely indicates a dependency on other binary assets. At some point the developer is ready to save and commit the components into the version control system. There is a known technique of a "continuous integration" (CI) in which an automated process notices that something was changed in the source code and so then the system knows that it needs to build it and make sure it passes all of the tests. The CI server will pull the source code which was committed by the developer in addition to all other relevant source code needed, build everything, and that results in, e.g., a portion of the application or the entire application itself. Take the case that the CI builds the final artifacts for the software; many organizations will put the newly built artifacts into the hosted repository within the repository manager. At the point after the CI build occurs, the system discussed herein can act and evaluate the entire output of the build process itself, such as discussed in connection with FIG. 8. That is, any component that is or will be put back into the hosted repository is evaluated again against the policies that have been established.

E. Outbound Use Case—Component does not Pass

In this scenario, the application to be released includes a component, which is determined to not pass the application policy. This is mostly transparent to the software developer. The process discussed above is followed. The difference is that the component did not pass the application policy, so that the software component fails. In the system herein, when software component does not pass, the system can tell the repository manager to inform the user that they cannot include the component and can notify them as to why the requested component fails (e.g., failed policy for certain reasons), plus the system can notify the user of a remediation such as by suggesting a version of the software component that does not fail (for example, if there is a security vulnerability in the requested component, notify the developer of the version in which the requested component is fixed). Then, the developer can specify the version(s) suggested by the system, i.e., notification of an accepted path, and thus surely resolve the problem within a few minutes.

F. Outbound Use Case—Release of New Application Version

In this scenario, a new version of an application is being released. There is an application policy associated with that application; the application policy is more specific than the repository policy (for example, as to licensing and security). Thus, components which are stored in the repository might not be accepted for the new application. That new application will be evaluated according to its specific policy, as to whether to release it (publish). If any of the components does not pass, then options for the programmatic steps for the does not pass action include one or more of: refusing to publish, or publishing with a warning as to why the application fails the application policy (which might be appropriate for a situation where the application is merely being rolled into a test environment), and/or releasing the software anyway.

A goal is that system anticipates and accounts for developer behavior that intentionally tries to circumvent the inbound controls on the repository. Accordingly, the outbound components to be included in the application are also identified as known or unknown to the repository. A component that is in the application but did not arrive through the firewall is identified as unknown to the repository. An application policy can specify that it will not accept unknown components, for example, in which case the application fails the policy.

G. Outbound Use Case—Release Old Application Under New Policy

In this scenario, an old application is released under a new or updated application policy. In this case, the final build is published back into the repository manager which will trigger the evaluation discussed herein. Accordingly, the application is evaluated against the new or updated application policy. The entire application is evaluated, and each of the components in the entire application is evaluated against the new or updated application policy. However, note that the internal components within the application are not new to the repository because they have been encountered before (for other applications), and thus the evaluation according to the repository policy is quick.

H. Policy Administrator Use

In this scenario, the system includes a repository manager with the system discussed herein. The system discussed herein can be run with the repository manager physical server, or perhaps on an additional server. The repository manager incorporates or is integrated with the system discussed herein, so that the use of the repository policy and application policy is transparent to the developers (until a component does not pass).

The user, who is likely a system administrator, wishes to deploy one or more policies for the system discussed herein. The user configures the repository policy, probably one for each of the different proxy repositories which exist on the repository manager. The user also configures the application policy, one for each of the different applications to which components will be published.

I. Variation—Quarantine of Software Component

Figure 9:
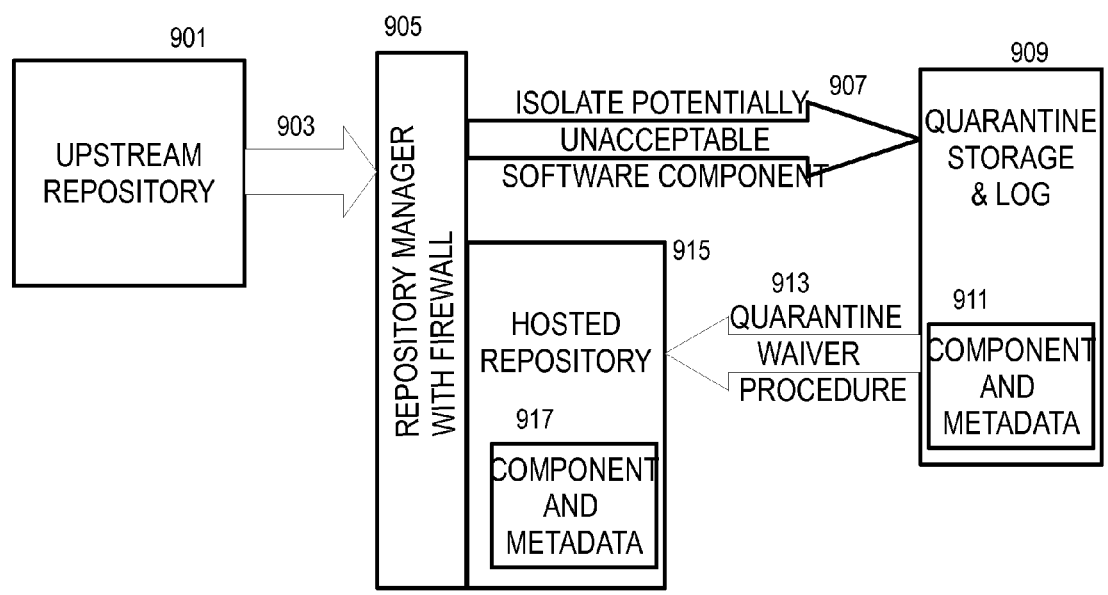
FIG. 9 is a data flow diagram illustrating a flow of a software component into and out of quarantine.

In a variation, a potentially unacceptable component the does not pass the repository policy can be stored in quarantine storage, and can be waived from quarantine storage into the hosted repository. Reference is now made to FIG. 9, a data flow diagram illustrating a flow of a software component into and out of quarantine. FIG. 9 illustrates an upstream repository 901, a repository manager 905 with firewall, a hosted repository 915 with a component and metadata 917 stored therein, a quarantine storage and log 909 with a component and metadata 911 stored therein. Some of the elements illustrated in FIG. 9 are the same as those discussed above in connection with FIG. 2, and details thereof will not be further discussed.

A component is inbound or outbound 903 for evaluation at the repository manager 905, as represented by being inbound from an upstream repository 901, but it could be any other way such as component which is outbound and is thus arriving for evaluation for storage by the repository manager 905. Assume that the repository manager with firewall 905 determines, pursuant to a policy, that the component does not pass and thus is a potentially unacceptable software component. Here, the software component which does not pass and is potentially unacceptable is stored 907 in isolation from the hosted repository 915, namely, in the quarantine storage 909, and the quarantine log 909 logs that the software component 911 is in the quarantine. In this way, the software component is stored apart from the hosted repository.

A quarantine waiver procedure 913 is provided so that the failed component and metadata 911 which are stored in the quarantine storage 909 can be moved to storage in the hosted repository 915. In this situation, the hosted repository policy is waived by the quarantine waiver procedure 913 which causes a failed component 917 to be stored in the hosted repository. The quarantine waiver procedure 913 can, for example, notify of the risks in the component, and/or require a user to affirmatively indicate that the failed component 911 is to be stored in the hosted repository 915. The quarantine waiver procedure 913 provides a way that a failed component, which may be evaluated on its own merits, can be included anyway in the hosted repository.

J. Variation—Remediation

In any use case that a software component does not pass a policy, the system can provide remediation. In the situation that remediation is provided and a software component does not pass, the system can determine a version of the software component that does not fail, for example, one or more previous or later versions of the software component with the same name which does not fail the policy (either application or repository policy, depending on which was failed), such as one in which the security vulnerability has been fixed. Then, the developer can indicate that the version(s) suggested by the system is accepted. The version which is suggested is known to pass the policy. This will provide a way to surely resolve the problem within a few minutes.

Conventionally, there is no developer tooling that provides possible remediation by suggesting an alternative version which is known to pass the policy which is being applied, for a component which does not pass the policy which is being applied.

VI. Additional Example Implementations

Figure 10:
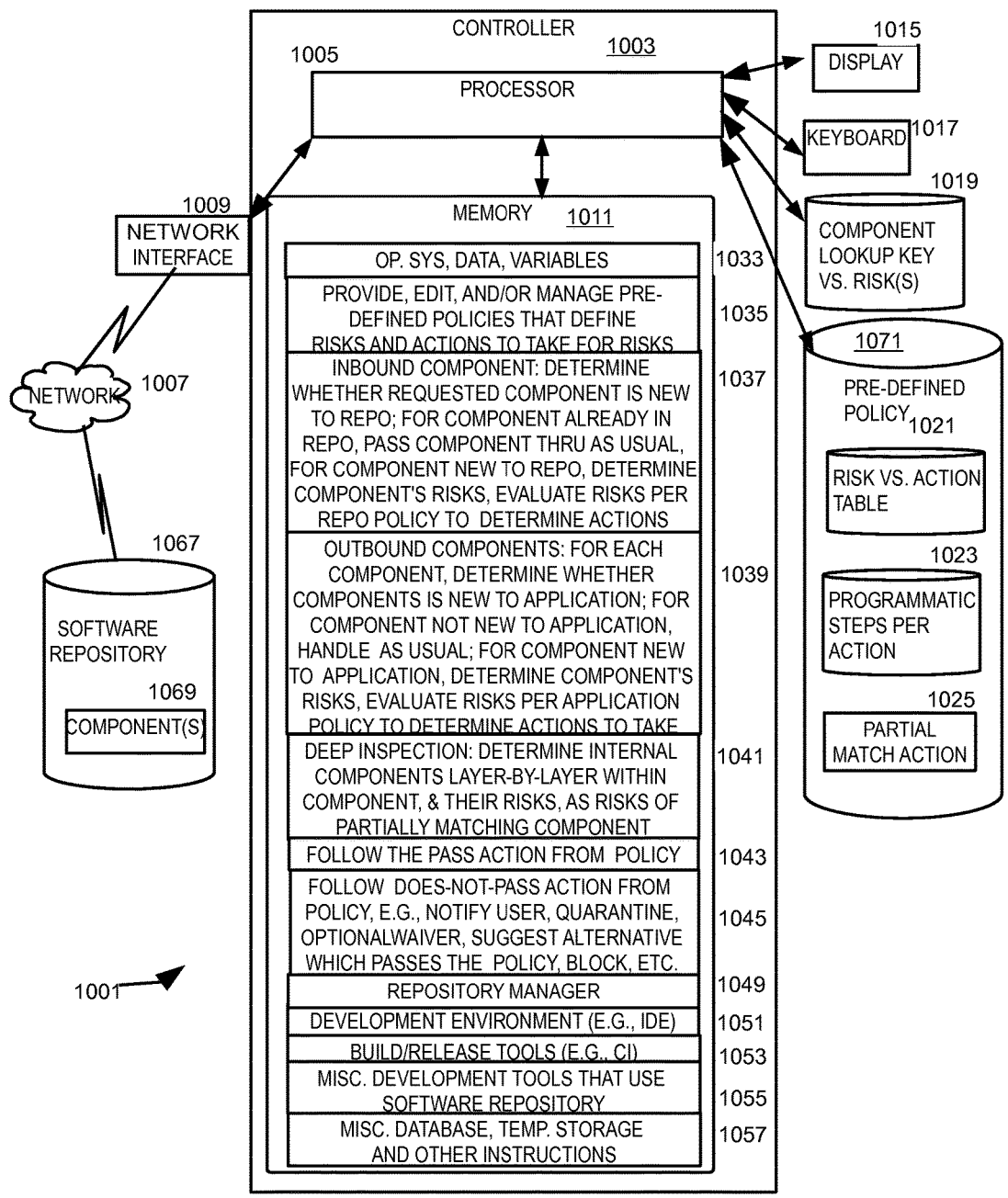
FIG. 10 is a block diagram illustrating relevant portions of a computer system.

This section will discuss additional concrete examples of implementation. FIG. 10 illustrates a computer implementation. One or more, or a combination of, the procedures of FIG. 3 to FIG. 8 conveniently may be implemented on the computer of FIG. 10, or any another apparatus which is appropriately configured.

Referring now to FIG. 10, a block diagram illustrating relevant portions of a computer system 1001 will be discussed and described. A computer system 1001 may include one or more controllers 1003, a processor 1005, an input/output (i/o) interface 1009 for communication such as with a network 1007, a memory 1011, a display 1015 (optional), and/or a user input device such as a keyboard 1017. Alternatively, or in addition to the keyboard 1017, a user input device may comprise one or more of various known input devices, such as a pointing device, a keypad, a computer mouse, a touchpad, a touch screen, a trackball, and/or a keyboard. The display 1015 is representative of a display that may present information to the user by way of a conventional liquid crystal display (LCD) or other visual display, and/or by way of a conventional audible device (e.g., a speaker) for playing out audible messages. Portions of the computer system 1001 are well understood to those of skill in this area and have been omitted to avoid obscuring the discussion.

The processor 1005 may comprise one or more microprocessors and/or one or more digital signal processors. The memory 1011 may be coupled to the processor 1005 and may comprise a read-only memory (ROM), a random-access memory (RAM), a programmable ROM (PROM), and/or an electrically erasable read-only memory (EEPROM). The memory 1011 may include multiple memory locations for storing, among other things, an operating system, data and variables 1033 for programs executed by the processor 1005; such programs can include one or more of the following: to provide 1035, edit, and/or manage pre-defined policies; to handle 1037 an inbound component; to handle 1039 an outbound component; deep inspection 1041 of a component; to follow 1043 the pass action from the policy; to follow 1045 the does-not-pass action from the policy; software development tools 1049, 1051, 1053, 1055; and a database 1057 for other information and/or instructions used by the processor 1005. The computer programs may be stored, for example, in ROM or PROM and may direct the processor 1005 in controlling the operation of the computer system 1001. Each of these functions is considered in more detail herein, to the extent that it is not detailed elsewhere in this document.

Responsive to manual signaling from the user input device represented by the keyboard 1017, in accordance with instructions stored in memory 1011, and/or automatically upon receipt of certain information via the i/o interface 1009, the processor 1005 may direct the execution of the stored programs.

The computer 1001 can access a software repository 1067 on which is stored one or more components, here represented by component(s) 1069. Although the components 1069 are illustrated as accessed over the network 1009, the components 1067 may be remotely and/or locally accessible from the computer 1001, over a wired and/or wireless connection; the components 1069 do not need to be limited to a database or a software repository 1067. Techniques are known for accessing components located in a software repository 1067, for example, hosted repositories, proxy repositories, upstream repositories, and the like.

The processor 1005 may be programmed to provide 1035, edit, and/or manage pre-defined policies, here represented by pre-defined policy 1071. The pre-defined policies define risks and actions to take for risks, as discussed above in more detail. It is expected that a pre-defined repository policy is provided for the software repository 1067; and if there is more than one repository, there is a pre-defined repository policy for each of the repositories. The repository policy defines the risks which are acceptable within the repository; the components which are included in the repository are expected to be compliant with the repository policy. It is expected that a pre-defined application policy is provided for one or more of the applications, for which the software repository 1067 supplies components. There can be a different application policy for two or more of the different applications. The pre-defined repository and application policies are discussed in more detail above. A pre-defined policy 1071 can include information indicating the correspondence between risks and the pass or do-not-pass action to take 1021 for each risk; information indication programmatic steps to take for the action 1023, optionally specific to the stage of enforcement which resulted in accessing the pre-defined policy; and optionally a partial match action 1025 to take when a component only partially matches risks, i.e., when risks are known only for internal components of the component.

The policies, here represented by a single pre-defined policy 1071, can be specified, edited, and/or managed via interaction with a user, such as by displaying selectable programmatic steps via the display 1015 and receiving inputs via the keyboard 1017, before the components are evaluated. Programmatic steps which are defined to be taken for the do-not-pass action, and optionally for a pass action, can be stored, for example in the programmatic steps per action storage 1023. Via interaction with the user, the pre-defined policies can define, for each of plural risks, an action, for example pass or fail, which indicates whether the risk passes or fails the policy. The risk vs. action table can be stored in a risk vs. action table 1021. A component lookup key vs. risk(s) storage 1019 can store information regarding a component (advantageously indicated as a fingerprint) and risks which the component is known to have, such as security threats, levels of security threats, licenses, and the like. Different storages 1019 can be provided for different kinds of risks, e.g., a different storage for security risks and a different storage for license risks. If a component is encountered which is not indicated in the component fingerprint vs. risks(s) storage, then information regarding the risk(s) can be obtained via known techniques; for example, the component can be scanned to determined level of security threats; and such information which is created can be added to the component lookup key vs. risk(s) storage 1019. In some implementations, the information from the component lookup key vs. risk(s) storage 1019 can be provided by an information providing service.

Techniques are known for generating lookup keys; an example is any hash function technique. Well known hash techniques include SHA-1, MD5, and many others that will map an input data set of variable length and output a small data set, sometimes referred to as a hash value, hash code, hash sum, check sum, or hash. The particular hash function is not important as long as the same technique is used to hash the file being evaluated and the known file to which it is compared. Any known or to-be-developed techniques can be used for comparing hash values and attempting to locate a matching hashed value.

The processor 1005 may be programmed to handle 1037 an inbound component. For example, it can be determined whether a component which is requested is new to the repository. For a component which is already in the repository, the component can be passed through to the requestor as usual. For a component new to the repository, the component's risks can be determined (such as by reference to the component lookup key vs. risks(s) storage 1019), and the risks can be evaluated according to repository policy to determine the action to take for the component. This has been discussed in more detail above.

The processor 1005 may be programmed to handle 1039 one or more outbound components. In operation, there may be one component, or a collection of components which are intended to be used together in a build or application. For example, for each of these components, it can be determined whether the component is new to the application. For a component which is not new to the application, the component will be handled as usual. For a component which is new to the application, the component's risks can be determined (such as by reference to the component lookup key vs. risks(s) storage 1019), and the risks can be evaluated according to application policy to determine the action to take for the component which is appropriate for the application. This has been discussed in more detail above.

In addition, in some implementations, for outbound component(s) which are determined to be new to the application, the processor may be programmed to handle the components as an inbound component. That is, after handling the components as an outbound component, the processor can submit the component to inbound processor and then store the components (when they pass) in the repository storage. It is expected, in practice, that most or all of the outbound components, which passed the application policy, will also pass the repository policy, because it is expected that the application policy at least as restrictive as the repository policy and specifies all of the risks in the repository policy. However, it is possible to prepare an application policy in which the risks merely overlap with risks specified in the repository policy, or an application policy which is totally different from the repository policy.

The processor 1005 may be programmed for deep inspection 1041 of a component. In the deep inspection, the internal components with in a component are determined, layer-by-layer, and the risks of the internal components are determined. The risks of the collective internal components can then be used as risks of the outermost component. In most embodiments, the deep inspection 1041 (if performed) will be performed only for a component which is known to the system, that is, the component fingerprints is not in the component lookup key vs. risk(s) storage 1019; and the deep inspection is performed recursively for internal components which are unknown, until the internal components are known or until none of the internal components are known. An example of inspecting internal components within a component is described, for example, in U.S. Pat. No. 8,825,689, titled "Method and system for matching unknown software component to known software component". Such a component is a partially matching component, and the risks of the internal components are used as the risks of the outer component. Using known techniques, the partially matching component can be assigned a value as to how much matches, for example, 99%, 80%, 75%, or similar. The policy(ies) can specify a partial match action 1025 to take for a "partially matching component," for example, a partially matching component must be at least a 90% match or it does not pass. Aspects of this have been discussed in more detail above.

The processor 1005 may be programmed to follow 1043 the pass action from the policy. When the component is determined to pass (for example, by not having any risk), according to the repository policy or the application policy which is applied, then the programmatic steps per action 1023 are retrieved from storage. As discussed above, the programmatic steps may also take into consideration the stage of enforcement, which can be determined or inferred by which of the developer tools is utilized, or which can be specified when the component is caused to be inbound or outbound. The programmatic steps for a component that passes are typically to pass the component through as usual so that the developer tool can function as usual (including to store the component in the repository). Other actions may be provided which are user-selectable, for example, to notify or log that a particular component passed a particular policy.

The processor 1005 may be programmed to follow 1045 the does-not-pass action from the policy. When a component is determined to not pass at least one risk according to the repository policy or the application policy which is applied, then the programmatic steps per action 1023 are retrieved from storage, optionally as corresponding to the stage of enforcement. The programmatic steps for a component that does not pass are follows, as specified per the application or repository policy.

The processor 1005 may be programmed with software development tools 1049, 1051, 1053, 1055. As will be understood in this technical field, the software development tools are represented herein by a repository manager 1049, a known development environment (for example, an IDE) 1051, conventional build/release tools (for example, a CI tool) 1053, and other typical, miscellaneous development tools 1055 that use a software repository. The repository manager 1049 can be integrated with the novel functions discussed above. The memory 1011 also can include other miscellaneous information in a misc. database 1057, along with the usual temporary storage and other instructions for other programs not considered herein.

The computer 1001 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which can be interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1005, memory 1011, a disk drive and/or removable storage medium are referred to as "computer-readable storage media" and provide non-transitory storage of computer programs and data.

It should be understood that FIG. 10 is described in connection with logical groupings of functions or resources. One or more of these logical groupings may be omitted from one or more embodiments, for example, the functionality of the deep inspection 1041, and providing/editing, and/or managing the predefined policies 1035 can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

VII. Glossary

Terms as used herein are intended to be interpreted first, as understood to one of skill in the art at a first level, of software repositories; and if not interpretable at the first level, than at a second level as understood by one skilled in the science of tools that support and manage software development; and if not interpretable at the first level and second level, then at a third level as understood to one of skill in the art of computer science; and then if not interpretable according to the first, second and third levels, according to a general dictionary.

The claims may use the following terms, which are defined to have the following meanings for the purpose of the claims herein. Other definitions may be specified in this document.

The term "byte code" as used herein is defined to mean an intermediate operational code which was generated by translating an input programming language, and then the byte code can be interpreted at the time the byte code is executed by the virtual machine which has its own instruction set independent of the native machine code for the hardware on which the virtual machine executes. Examples of computer languages which use "byte code" include, without limitation, Java, .NET, Scala, jython, groovy, and Pascal The term "component" used herein is defined to be a specific version (sometimes referred to as a canonical version) of pre-existing executable software, or a reusable pre-existing self-contained software code building block which is not a complete stand-alone finished product ready for use and which is byte code or run-time executable code; a component can be the subject of a risk such as a license or a target of a security vulnerability. Less formally, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product.

A component can comprise multiple, nested components themselves. For example, a Java web application packaged as a WAR component might contain various JAR components and JavaScript libraries, each of which is a component themselves.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

"Open source" software is defined herein to be source code that allows distribution as source code as well as compiled form, with a well-publicized and indexed means of obtaining the source, optionally with a license that allows modifications and derived works.

The term "repository" or "software repository" used herein are defined to mean an electronic storage system that stores software build components (sometimes referred to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifact. A repository can be remote or local.

Examples of conventional software repositories include, by way of example but without limitation: the Central Repository (also known as Maven Central), the NuGet Gallery, RubyGems.org, npmjs.org, and many others. Repositories tend to rely on pre-defined formats and tools, for example, the Maven repository format, REST API interactions, different directory structures with format specific files for metadata, and the like.

Software repositories are accessed by tools, including by way of example but without limitation: build tools such as Maven, Gradle, rake, grunt, and others; package managers such as npm, nugget, gem, and others; Integrated Development Environments such as Eclipse, IntelliJ, and many others.

The term "software build" used herein specifically is defined to mean a process as pre-defined in an executable build program of converting a plurality of components (some or all of which may be obtained from a repository) and combining the results into an executable stand-alone computer program or a software component for use in a further software build, including at least compiling components and linking compiled components and possibly binary components (which can be from the repository), in a predetermined order as defined in the build program.

The term "compiler" is used herein specifically to mean a computer program(s) that transforms source code written in a programming language into a target language that is readable by a computer, often in the form of binary code or bytecode, so as to create an executable program.

The phrase "automatically without manual intervention," when used in a claim, is defined to mean that the particular step occurs after the step is initiated until limitations recited in the step are finished without requiring a user to provide input to a processor.

VIII. Implementation and Technical Notes

The above discussion has assumed that the reader has a sufficient technical background for appreciating the points made. This section provides some supplementary implementation and/or technical notes which discuss some technical information that may be relevant.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for controlling a potentially unacceptable software component intended for a repository environment which includes a software repository have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is used by a single developer or administrator at a single site. An embodiment may be used by numerous developers, administrators and/or related users, if preferred, at one or more sites.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding, determining, or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, conventional firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-implemented method of controlling a potentially unacceptable software component intended for a repository environment which includes a software repository, comprising:

providing, in a policy storage, a pre-defined repository policy which defines risks that determine software components deemed acceptable and/or unacceptable for adding to the software repository, the pre-defined repository policy defines, for each of the risks, an action to take for the risk, wherein the actions to take for the risk are selected from at least a pass action and a does-not-pass action, wherein the actions are pre-defined programmatic steps, wherein the does-not-pass action, which pre-defines how to dispose of the software components which do not pass the repository policy, is configured to be pre-selected one or more of a plurality of pre-determined, selectively-combinable does-not-pass-actions, wherein the does-not-pass action is further configured to specify pre-selected different combinations of the does-not-pass actions which are pre-selected per each different stage of enforcement, wherein the risks are further evaluated based on the stage of enforcement;

determining, by a processor, responsive to a software component which is a canonical version, whether the canonical version of the software component is new to the software repository;

when the software component is determined to not be new to the software repository:
   passing, by the processor, the software component through;

when the software component is determined to be new to the software repository, then prior to adding the software component to the software repository:
   determining, by the processor, from a risk match unit, risks which match the software component, wherein the risks which match the software component are determined based on a lookup key which is unique to the canonical version of the software component;
   evaluating, by the processor, the risks which were determined to match the software component, to determine the actions, as defined in the pre-defined repository policy, to take for the risks determined to match the software component, wherein the action to take is specific to a type of the risk and defines how to dispose of the software component;
   when the risk of the software component is evaluated to pass the pre-defined repository policy, following, by the processor, the pass action, defined in the pre-defined repository policy, for the determined action, wherein the pass action includes to add the software component to the software repository;
   when the risk of the software component is evaluated to not pass the pre-defined repository policy, following, by the processor, the pre-selected one or more does-not-pass-actions of the does-not-pass action, defined in the pre-defined repository policy, for the determined action.

2. The method of claim 1,
wherein the pre-defined repository policy further comprises a pre-defined action to take for a partially matching software component,
further comprising, when the software component is determined to be new to the software repository,
   when it is determined that the software component does not match any of components that are known to the risk match unit,
      recursively performing, by the processor, a deep inspection of internal software components at a next layer internal to the software component until the internal software components are determined which match a known component which is known to the risk match unit;
      performing the step of determining the risks, for the internal software components which are matched to known software components;
      performing the step of evaluating the risks, for the risks of the internal software components which are matched to known software components;
      performing the step of following the action defined in the pre-defined repository policy, for the risks of the internal components which are matched to known components, in combination with following the pre-defined action to take for the partially matching software component.

3. The method of claim 1, further comprising a quarantine storage which is quarantined from user access, and a log of components in the quarantine storage,
further comprising, by the processor, isolating the software component, which has the risk evaluated to not pass the pre-defined repository policy, by being stored into quarantine storage instead of being stored in the software repository; and storing a fact that the software component is quarantined; and
further determining, by the processor, responsive to receiving a request for the software component, whether the software component which is requested is in the quarantine storage, and providing a quarantine notification that the software component is determined to be quarantined and not in the software repository.

4. The method of claim 3, further comprising, when the software component is determined to be quarantined,
determining, by the processor, a different canonical version of the quarantined component, wherein the different canonical version passes the pre-defined repository policy,
the quarantine notification indicates the different canonical version of the quarantined component that passes the pre-defined repository policy.

5. The method of claim 3, further comprising, for the quarantined component, by the processor, guiding a user through determining whether the quarantined component should be accepted into the software repository as waived, and then moving the quarantined component which is waived from the quarantine into the software repository.

6. The method of claim 1, wherein the determination of the risks includes
preparing, by the processor, the lookup key based on metadata of the software component; and
retrieving, by the processor, based on the lookup key from the software component, information indicating the risks of the software component.

7. The method of claim 1, wherein
the risks, defined in the pre-defined repository policy for software components, include licenses to which the software component is subject, and security vulnerabilities of the software component,
the determination of the risks includes
preparing, by the processor, based on metadata from the software component, as the lookup key which is unique to the canonical version of the software component, a licenses-lookup key and a security-vulnerabilities-lookup key, which are both unique to the canonical version of the software component;
retrieving, by the processor, from a licenses-lookup information provider, based on the licenses-lookup key for the canonical version of the software component, information indicating the licenses of the canonical version of the software component; and
retrieving, by the processor, from a security vulnerabilities information provider, based on the security-vulnerabilities-lookup key for the canonical version of the software component, information indicating the security vulnerabilities of the canonical version of the software component.

8. The method of claim 1, wherein the action to take when the software component is determined to be new to the software repository and the risks of the software component are all evaluated to pass the pre-defined repository policy with no errors, include one or more of
logging, by the processor, the software component which is being added to the software repository,
notifying, by the processor, via e-mail, of the new component.

9. A computer, comprising:
an i/o interface operable to communicate with a software repository; and
a processor cooperatively operable with the i/o interface, and configured to perform the method of claim 1.

10. A non-transitory computer readable medium comprising executable instructions for performing the method of claim 1.

11. The method of claim 1,
wherein the selectively-combinable does-not-pass-actions include block the software component from use, allow the software component to be used, move the software component into quarantine, and propose an alternative canonical version of the software component which passes the pre-defined repository policy.

12. A computer-implemented method of controlling a potentially unacceptable software component intended for a repository environment which includes a software repository, comprising:
providing, in a policy storage, a pre-defined repository policy which defines risks that determine software components deemed acceptable and/or unacceptable for adding to the software repository, the pre-defined repository policy defines, for each of the risks, an action to take for the risk, wherein the actions to take for the risk are selected from at least a pass action and a does-not-pass action, wherein the actions are pre-defined programmatic steps,
wherein the does-not-pass action, which pre-defines how to dispose of the software components which do not pass the repository policy, is configured to be pre-selected one or more of a plurality of pre-determined, selectively-combinable does-not-pass-actions,
wherein the does-not-pass action is further configured to specify pre-selected different combinations of the does-not-pass actions which are pre-selected per each different stage of enforcement, wherein the risks are further evaluated based on the stage of enforcement;
determining, by a processor, responsive to an activity that includes a plurality of software components, wherein each of the software components is a canonical version, for each of the software components, whether the canonical version of the software component is new to the software repository;
when the software component is determined to not be new to the software repository:
passing, by the processor, the software component through;
when the software component is determined to be new to the software repository, then prior to adding the software component to the software repository:
determining, by the processor, from a risk match unit, risks which match the software component, wherein the risks which match the software component are determined based on a lookup key which is unique to the canonical version of the software component;
evaluating, by the processor, the risks which were determined to match the software component, to determine the actions, as defined in the pre-defined repository policy, to take for the risks determined to match the software component, wherein the action to take is specific to a type of the risk and defines how to dispose of the software component, wherein the does-not-pass action, which pre-defines how to dispose of the software component which does not pass the repository policy, is configured to be a pre-selected plurality of pre-determined, selectively-combinable does-not-pass-actions;
when the risk of the software component is evaluated to pass the pre-defined repository policy, following, by the processor, the pass action, defined in the pre-defined repository policy, for the determined action, wherein the pass action includes to add the software component to the software repository;
when the risk of the software component is evaluated to not pass the pre-defined repository policy, following, by the processor, the pre-selected plurality of one or more does-not-pass-actions of the does-not-pass action, defined in the pre-defined repository policy, for the determined action.

13. The method of claim 12,
wherein the pre-defined repository policy further comprises a pre-defined action to take for a partially matching software component,
further comprising, when the software component is determined to be new to the repository,
when it is determined that the software component does not match any of components that are known to the risk match unit,
recursively performing, by the processor, a deep inspection of internal software components at a next layer internal to the software component until the internal software components are determined which match a known component which is known to the risk match unit;
performing the step of determining the risks, for the internal software components which are matched to known software components;
performing the step of evaluating the risks, for the risks of the internal software components which are matched to known software components;
performing the step of following the action defined in the pre-defined repository policy, for the risks of the internal components which are matched to known components, in combination with following the pre-defined action to take for the partially matching software component.

14. The method of claim 12, further comprising a quarantine storage which is quarantined from user access, and a log of components in the quarantine storage,
further comprising, by the processor, isolating the software component, which has the risk evaluated to not pass the pre-defined repository policy, by being stored into quarantine storage instead of being stored in the software repository; and storing a fact that the software component is quarantined; and
further determining, by the processor, responsive to receiving a request for the software component, whether the software component which is requested is in the quarantine storage, and providing a quarantine notification that the software component is determined to be quarantined and not in the software repository.

15. The method of claim 12, further comprising, when the software component has the risk evaluated to not pass the pre-defined repository policy,
determining, by the processor, a different canonical version of the software component, wherein the different canonical version passes the pre-defined repository policy, and
providing a notification which indicates that the software component is not acceptable and which indicates the different canonical version of the software component that passes the pre-defined repository policy.

16. The method of claim 15, further comprising, for the software component, by the processor, guiding a user through determining whether the software component should be accepted into the software repository as waived, and then moving the software component which is waived into the software repository.

17. The method of claim 12, wherein the determination of the risks includes
preparing, by the processor, the lookup key based on metadata of the software component; and
retrieving, by the processor, based on the lookup key from the software component, information indicating the risks of the software component.

18. The method of claim 12, wherein
the risks, defined in the pre-defined repository policy for software components, include licenses to which the software component is subject, and security vulnerabilities of the software component,
the determination of the risks includes
preparing, by the processor, based on metadata from the software component, as the lookup key which is unique to the canonical version of the software component, a licenses-lookup key and a security-vulnerabilities-lookup key, which are both unique to the canonical version of the software component;
retrieving, by the processor, from a licenses-lookup information provider, based on the licenses-lookup key for the canonical version of the software component, information indicating the licenses of the canonical version of the software component; and
retrieving, by the processor, from a security vulnerabilities information provider, based on the security-vulnerabilities-lookup key for the canonical version of the software component, information indicating the security vulnerabilities of the canonical version of the software component.

19. The method of claim 12, wherein the action to take when the software component is determined to be new to the software repository and the risks of the software component are all evaluated to pass the pre-defined repository policy with no errors, include one or more of
logging, by the processor, the software component which is being added to the software repository,
notifying, by the processor, via e-mail, of the new component.

20. A computer, comprising:
an i/o interface operable to communicate with a software repository; and
a processor cooperatively operable with the i/o interface, and configured to perform the method of claim 12.

21. A non-transitory computer readable medium comprising executable instructions for performing the method of claim 12.

22. The method of claim 12,
wherein the selectively-combinable does-not-pass-actions include block the software component from use, allow the software component to be used, move the software component into quarantine, and propose an alternative canonical version of the software component which passes the pre-defined repository policy.

23. A computer-implemented method of controlling a potentially unacceptable software component intended for a repository environment which includes a software repository, comprising:
providing, in a policy storage, a pre-defined repository policy associated with the repository environment, the pre-defined repository policy defines risks and, for each of the risks, an action to take for the risk, wherein the actions to take for the risk are selected from at least a pass action and a does-not-pass action, wherein the actions are pre-defined programmatic steps;
determining, by a processor, responsive to receiving a request for a software component, whether the software component which is requested is new to the software repository;
when the software component is determined to not be new to the software repository:
passing, by the processor, the software component through;
when the software component is determined to be new to the software repository, then prior to adding the software component to the software repository:
determining, by the processor, from a risk match unit, risks which match the software component;
evaluating, by the processor, the risks which were determined to match the software component, to determine the actions, as defined in the pre-defined repository policy, to take for the risks determined to match the software component;
following, by the processor, the pass action, defined in the pre-defined repository policy, for components that are determined to pass, wherein the pass action includes to add the software component to the software repository, when the risk of the software component is evaluated to pass the pre-defined repository policy;
following, by the processor, the does-not-pass action, defined in the pre-defined repository policy, for components that are determined to not pass as a potentially unacceptable software component, when the risk of the software component is evaluated to not pass the pre-defined repository policy,
wherein the pre-defined repository policy further comprises a pre-defined action to take for a partially matching software component, further comprising, when the software component is determined to be new to the software repository,
when it is determined that the software component does not match any of the components that is known to the risk match unit,
recursively performing, by the processor, a deep inspection of internal software components at a next layer internal to the software component until the internal software components are determined which match a known component which is known to the risk match unit;
performing the step of determining the risks, for the internal software components which are matched to known software components;
performing the step of evaluating the risks, for the risks of the internal software components which are matched to known software components;
performing the step of following the action defined in the pre-defined repository policy, for the risks of the internal components which are matched to known components, in combination with following the pre-defined action to take for the partially matching software component.

24. A computer-implemented method of controlling a potentially unacceptable software component intended for a repository environment which includes a software repository, comprising:
providing, in a policy storage, a pre-defined application policy associated with both the repository environment and an application, the pre-defined application policy is different from a policy associated with the repository and the pre-defined application policy can be different from policies associated with other applications, the pre-defined application policy defines risks and, for each of the risks, an action to take for the risk, wherein the actions to take for the risk are selected from at least a pass action and a does-not-pass action, wherein the actions are pre-defined programmatic steps;
determining, by a processor, responsive to a commit asset action or build action for the application that includes software components, for each of the software components, whether the software component is new to the application;
when the software component is determined to not be new to the application:
passing, by the processor, the software component through;
when the software component is determined to be new to the application:
determining, by the processor, from a risk match unit, risks which match the software component;
evaluating, by the processor, the risks which were determined to match the software component, to determine the actions, as defined in the pre-defined application policy, to take for the risks determined to match the software component;
following, by the processor, the pass action, defined in the pre-defined application policy, for components that are determined to pass, wherein the pass action includes to add the software component to the software repository, when the risk of the software component is evaluated to pass the pre-defined application policy;
following, by the processor, the does-not-pass action, defined in the pre-defined application policy, for components that are determined to not pass as a potentially unacceptable software component, when the risk of the software component is evaluated to not pass the pre-defined application policy,
wherein the pre-defined application policy further comprises a pre-defined action to take for a partially matching software component,
further comprising, when the software component is determined to be new to the application,
when it is determined that the software component does not match any of the components that is known to the risk match unit,
recursively performing, by the processor, a deep inspection of internal software components at a next layer internal to the software component until the internal software components are determined which match a known component which is known to the risk match unit;
performing the step of determining the risks, for the internal software components which are matched to known software components;
performing the step of evaluating the risks, for the risks of the internal software components which are matched to known software components;
performing the step of following the action defined in the pre-defined application policy, for the risks of the internal components which are matched to known components, in combination with following the pre-defined action to take for the partially matching software component.

* * * * *